(12) United States Patent
Monadgemi

(10) Patent No.: US 8,335,029 B2
(45) Date of Patent: Dec. 18, 2012

(54) MICROMIRROR ARRAYS HAVING SELF ALIGNED FEATURES

(75) Inventor: Pezhman Monadgemi, Fremont, CA (US)

(73) Assignee: Pacific Biosciences of California, Inc., Menlo Park, CA (US)

( * ) Notice: Subject to any disclaimer, the term of this patent is extended or adjusted under 35 U.S.C. 154(b) by 154 days.

(21) Appl. No.: 13/045,150

(22) Filed: Mar. 10, 2011

(65) Prior Publication Data

US 2011/0222179 A1  Sep. 15, 2011

Related U.S. Application Data

(60) Provisional application No. 61/312,953, filed on Mar. 11, 2010.

(51) Int. Cl.
*G02B 26/08* (2006.01)
(52) U.S. Cl. ..................................... 359/221.2
(58) Field of Classification Search .............. 359/221.2, 359/900, 838; 216/24; 427/164; 430/322–324
See application file for complete search history.

(56) References Cited

U.S. PATENT DOCUMENTS

| | | | |
|---|---|---|---|
| 4,649,280 A | 3/1987 | Holland et al. | |
| 5,228,109 A | 7/1993 | Fujii et al. | |
| 6,437,345 B1 | 8/2002 | Bruno-Raimondi et al. | |
| 6,917,726 B2 | 7/2005 | Levene et al. | |
| 7,170,050 B2 | 1/2007 | Turner et al. | |
| 7,315,503 B2 | 1/2008 | Cho et al. | |
| 7,714,303 B2 | 5/2010 | Lundquist et al. | |
| 2003/0059820 A1 | 3/2003 | Vo-Dinh | |
| 2004/0124336 A1 | 7/2004 | MacCraith et al. | |
| 2005/0053974 A1 | 3/2005 | Lakowicz et al. | |
| 2006/0273245 A1 | 12/2006 | Kim et al. | |
| 2007/0134128 A1 | 6/2007 | Korlach | |
| 2007/0206187 A1 | 9/2007 | Lundquist et al. | |
| 2008/0090157 A1* | 4/2008 | Chung et al. ............. 430/5 | |
| 2009/0024331 A1 | 1/2009 | Tomaney et al. | |
| 2009/0056790 A1 | 3/2009 | Tian et al. | |

FOREIGN PATENT DOCUMENTS

| | | |
|---|---|---|
| EP | 1425570 B1 | 3/2009 |
| JP | 4091212 B2 | 3/2008 |
| WO | 0245845 A2 | 6/2002 |
| WO | 02059583 A1 | 8/2002 |

(Continued)

OTHER PUBLICATIONS

Eid, et al., "Real-time DNA sequencing from single polymerase molecules" Science (2009) 323(5910):133-138.

(Continued)

*Primary Examiner* — Euncha Cherry
(74) *Attorney, Agent, or Firm* — Robert H. Reamey

(57) ABSTRACT

Methods, arrays, and systems for the optical analysis of multiple chemical, biological, or biochemical reactions are provided. The invention includes methods for producing arrays of micromirrors on transparent substrates, each micromirror comprising a nanostructure or optical confinement on its top. The arrays are produced by a process in which lateral dimensions of both the nanostructures and micromirrors are defined in a single step, allowing for control of the relative placement of the features on the substrate, minimizing the process-related defects, allowing for improved optical performance and consistency. In some aspects, the invention provides methods of selectively etching large features on a substrate while not concurrently etching small features. In some aspects, the invention provides methods of etching large features on a substrate using hard mask materials.

15 Claims, 21 Drawing Sheets

FOREIGN PATENT DOCUMENTS

| | | |
|---|---|---|
| WO | 03023377 A1 | 3/2003 |
| WO | 2007095119 A2 | 8/2007 |
| WO | 2007095235 A2 | 8/2007 |
| WO | 2008010767 A2 | 1/2008 |

OTHER PUBLICATIONS

Gryczynski, I. et al., "Radiative decay engineering 4. Experimental studies of surface plasmon-coupled directional emission" Anal. Biochem (2004) 324:170-182.

Hellen, E.H., et al., "Fluorescence emission at dielectric and metal-film interfaces" J Opt. Soc. Am. B (1987) 4(3):337-350.

Korlach, J. et al., "Selective aluminum passivation for targeted immobilization of single DNA polymerase molecules in zero-mode waveguide nanostructures" PNAS 2008 105(4):1176-1181.

Lakowicz, J.R. "Radiative decay engineering 3. Surface plasmon-coupled directional emission" Anal. Biochem (2004) 324:153-169.

Levene et al., "Zero-mode waveguides for single-molecule analysis at high concentrations" Science (2003) 299 (5607):682-686.

Lundquist et al. "Parallel confocal detection of single molecules in real time" Opt Lett (2008) 33(9):1026-1028.

Mattheyses, A.L. et al., "Fluorescence emission patterns near glass and metal-coated surfaces investigated with back focal plane imaging" J Biomed Opt (2005) 10(5):054007-1 to 054007-6.

MacCraith, B. evaluation Anuglar emission profiles for fluorsneare a metallic or non-metallic interface, In my opinion, when it comes to TIRF, Axelrod has lead the way, both theoretically (Hellen and Axelrod 1987) and experimentally (Mattheyses and Axelrod 2005).

Smith, D.S. et al., "Signal enhancement of surface plasmon-coupled directional emission by a conical mirror" Appl Opt (2008) 47(28):5229-5234.

Sullivan, K.G. et al., "Directional, enhanced fluorescence from molecules near a periodic surface" Appl Opt (1994) 33(13):2447-2454.

Weber, W.H. et al. "Energy transfer from an excited dye molecule to the surface plasmons of an adjacent metal" Opt Lett (1979) 4(8):236-238.

International Search Report and Written Opinion dated Jul. 16, 2010 for corresponding application PCT/US2009/005319.

International Preliminary Report on Patentability dated Apr. 14, 2011 for corresponding application PCT/US2009/005319.

Lenne, P-F. et al. "Fluorescence fluctuations analysis in nanoapertures: physical concepts an biological applications" Histochem Cell Biol (2008) 130:795-805.

International Search Report and Written Opinion dated Nov. 30, 2011 for corresponding application PCT/US2011/000452.

International Preliminary Report on Patentability dated Sep. 20, 2012 for related PCT/US2011/000452.

\* cited by examiner

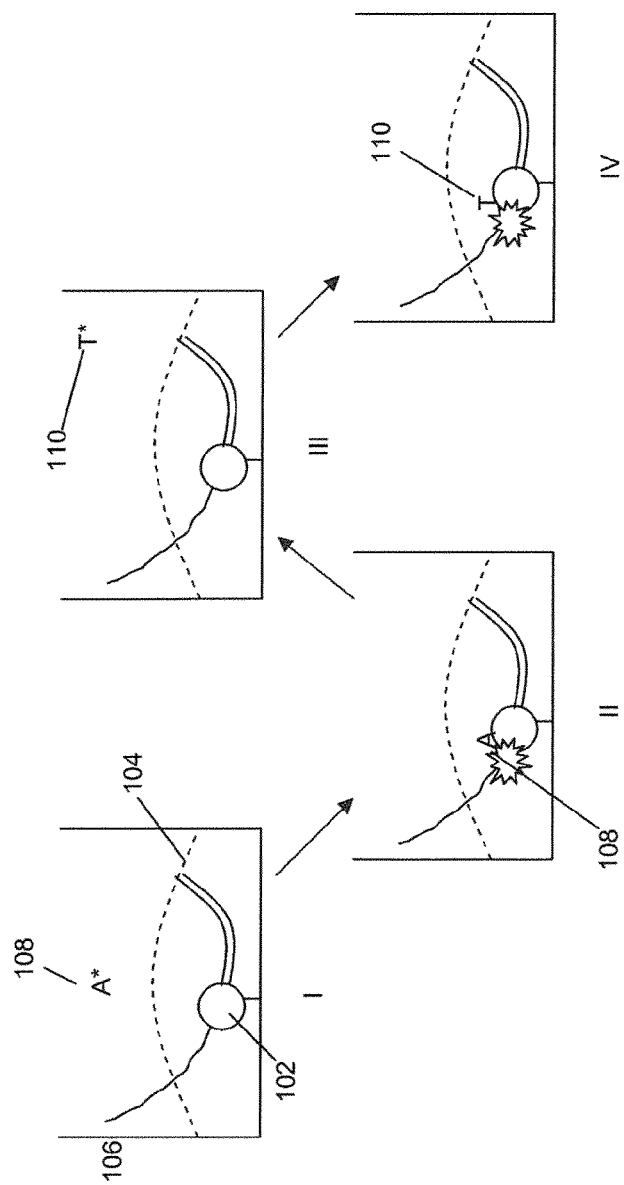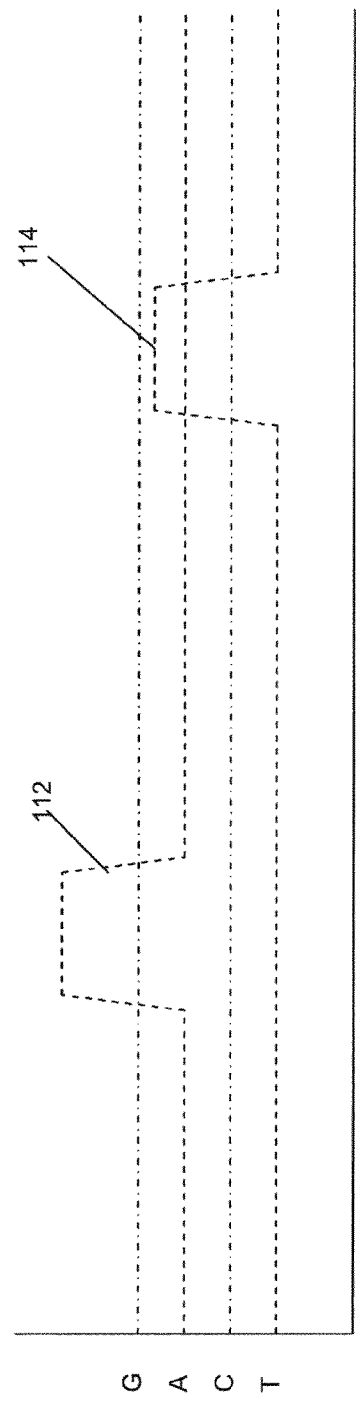
Figure 1A
Figure 1B

Micromirror Illumination

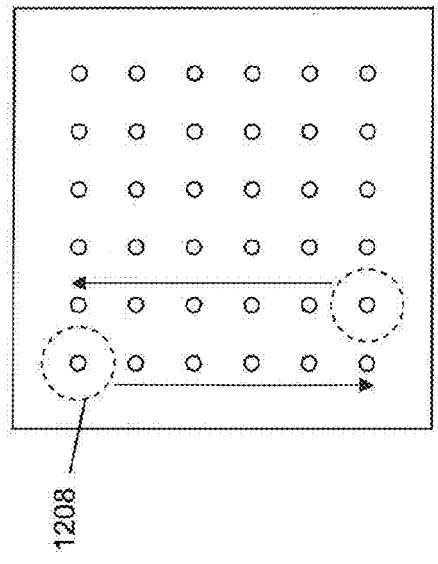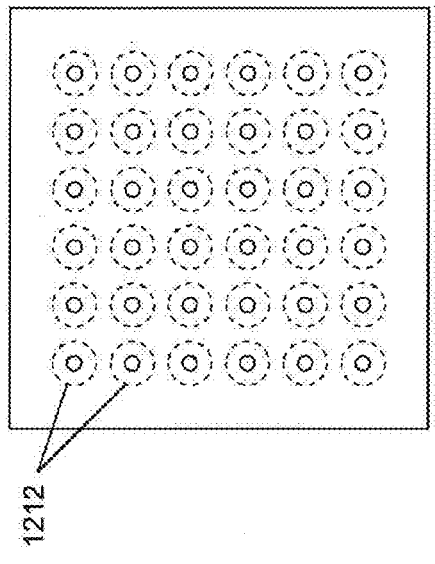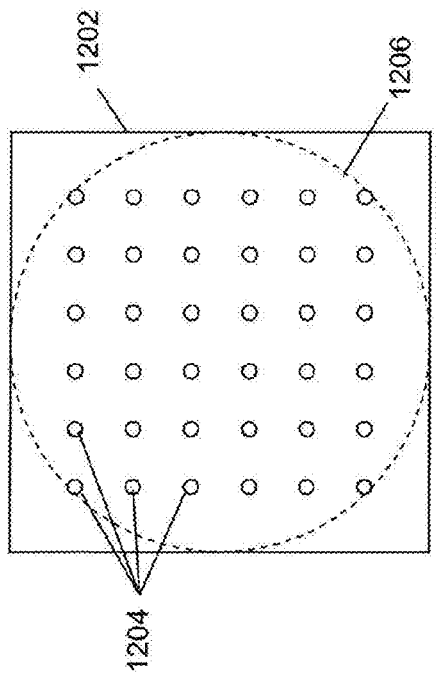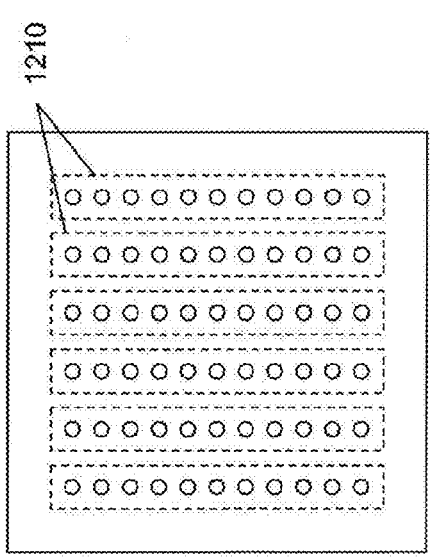
Figure 12A
Figure 12B
Figure 12C
Figure 12D

MICROMIRROR ARRAYS HAVING SELF ALIGNED FEATURES

CROSS-REFERENCE TO RELATED APPLICATIONS

This application claims the benefit of U.S. Provisional Patent Application No. 61/312,953 filed Mar. 11, 2010, the disclosure of which is incorporated herein by reference in its entirety for all purposes.

STATEMENT REGARDING FEDERALLY SPONSORED RESEARCH

Not Applicable.

BACKGROUND OF THE INVENTION

The ability to increase the number of analyses being carried out at any given time by a given system has been a key component to increasing the utility and extending the lifespan of analytical systems. In particular, by increasing the multiplex factor of analyses with a given system, one can increase the overall throughput of the system, thereby increasing its usefulness while decreasing the costs associated with that use.

In optical analyses, increasing multiplex often poses increased difficulties, as it may require more complex optical systems, increased illumination or detection capabilities, and new reaction containment strategies. In some cases, systems seek to increase multiplex by many fold, and even orders of magnitude, which further implicate these considerations. Likewise, in certain cases, the analytical environment for which the systems are to be used is so highly sensitive that variations among different analyses in a given system may not be tolerable. These goals are often at odds with a brute force approach of simply making systems bigger and of higher power, as such steps often give rise to even greater consequences, e.g., in inter reaction cross-talk, decreased signal to noise ratios resulting from either or both of lower signal and higher noise, and the like.

For optical systems having arrays of optical confinements, effectively directing excitation light to the optical confinement, and effectively collecting light emitted by the optical confinement can increase efficiency. In some cases, the light can be directed to and from the optical confinements using optical elements such as micromirrors integral to the substrate comprising the optical confinements. For such systems, the alignment of the optical confinement and the optical elements can be important for the quality of the analysis.

It would therefore be desirable to provide analytical systems that have improved alignment between optical confinements and optical elements integral to the substrate on which the optical confinements are disposed. The present invention meets these and a variety of other needs.

BRIEF SUMMARY OF THE INVENTION

In one aspect the invention provides a method for producing an array of micromirror structures each having a nanostructure on its top comprising: (a) providing a transparent substrate having a cladding layer on top of the substrate and a first hard mask layer on the top of the cladding layer, wherein the cladding layer and first hard mask layers are patterned to have features extending through both layers to the substrate, the pattern having small features and large features, the small features having a lateral dimension that is smaller than the smallest lateral dimension of the large features; (b) masking the small features with either a second hard mask layer or a resist; (c) etching the substrate to produce depressions in regions of the substrate corresponding to the large features while not etching the regions of the substrate corresponding to the small features; (d) undercutting the first hard mask layer; (e) depositing a reflective layer such that the deposited reflective layer has discontinuities corresponding to areas wherein the first hard mask layer has been undercut; and (f) removing the first hard mask layer and the resist or the second hard mask layer, thereby removing the reflective layer over the regions of the substrate comprising the small features, thereby producing micromirror structures, each having a nanostructure on its top.

In some embodiments the small features have a lateral dimension that is 1.5 times smaller than the smallest lateral dimension of the large features. In some embodiments the small features have a lateral dimension that is 10 times smaller than the smallest lateral dimension of the large features.

In one aspect the invention provides a method comprising the steps of: providing a substrate having a cladding layer on top of the substrate and a first hard mask layer on the top of the metal cladding layer, wherein the cladding layer and hard mask layers are patterned to have features extending through both layers to the substrate, the pattern having small features and large features, the small features having a lateral dimension less than or equal to W and the large features having a lateral dimension of greater than W; selectively depositing a second hard mask layer onto the first hard mask layer at a vertical thickness of about 0.5 W or greater such that the small features are sealed by the second hard mask layer and the large features are not sealed; exposing the substrate to an etchant such that regions of the substrate corresponding to the large features are etched, while the regions of the surface corresponding to the small features are not etched; undercutting the first hard mask layer; depositing a reflective layer such that the deposited reflective layer has discontinuities corresponding to regions wherein the first hard mask layer has been undercut; and removing the first hard mask layer and the second hard mask layer, thereby removing the reflective material over the regions of the substrate comprising the small features, thereby producing micromirror structures, each having a nanostructure on its top.

In one aspect the invention provides a method comprising the steps of: providing a substrate having a cladding layer on top of the substrate and a first hard mask layer on the top of the metal cladding layer, wherein the cladding layer and first hard mask layers are patterned to have features extending through both layers to the substrate, the pattern having small features and large features, the small features having a lateral dimension that is smaller that the smallest lateral dimension of the large features; depositing, exposing, and developing a resist in a pattern such that the resist masks the small features; exposing the substrate to an etchant such that regions of the substrate corresponding to the large features are etched, while the regions of the surface corresponding to the small features are not etched; undercutting the first hard mask layer; depositing a reflective layer such that the deposited reflective layer has discontinuities corresponding to regions wherein the hard mask layer has been undercut; and removing the hard mask layer and the resist, thereby removing the reflective material over the regions of the substrate comprising the small features, thereby producing micromirror structures, each having a nanostructure on its top.

In some embodiments the small features have a lateral dimension of less than about 500 nm. In some embodiments the small features have a lateral dimension that is 10 times smaller that the smallest lateral dimensions of the large features.

In some embodiments the cladding layer comprises a metal. In some embodiments the cladding layer comprises aluminum. In some embodiments the first hard mask layer comprises germanium. In some embodiments the first hard mask layer comprises silicon. In some embodiments the first hard mask layer comprises titanium. In some embodiments the first hard mask layer comprises titanium nitride.

In some embodiments the second hard mask layer comprises silicon-germanium. In some embodiments the second hard mask layer comprises silicon. In some embodiments the substrate comprises a silica-based material. In some embodiments the substrate comprises fused silica.

In some embodiments the nanostructure comprises a nanoscale aperture. In some embodiments the nanostructure comprises an optical confinement. In some embodiments one or both of the first or second hard mask layers comprise a semiconductor or a metal. In some embodiments one or both of the hard mask layers comprise silicon, germanium, silicon germanium, carbon, silicon carbide, chromium, titanium, titanium nitride, tungsten, silver, or gold.

In some embodiments the step of selectively depositing the second hard mask layer comprises electroplating, chemical vapor deposition, or electroless plating. In some embodiments the first hard mask layer and the cladding are etched in the same etch step to produce the small features and large features. In some embodiments the cladding comprises Al, the first hard mask layer comprises Ge, Si, SiGe, or Cr.

In some embodiments the small features and large features are produced by etching the cladding whereby the first hard mask layer acts as an antireflective coating eliminating the need for a separate antireflective coating. In some embodiments the first hard mask layer comprises germanium, and the second hard mask layer comprises either germanium or silicon/germanium. In some embodiments the second hard mask layer is deposited by chemical vapor deposition.

In one aspect the invention provides a method for selectively etching a substrate comprising; providing a substrate having a first hard mask on top of the substrate, the first hard mask patterned with small features and large features; the small features having a lateral dimension of W or less and the large features having a lateral dimension of greater than W; selectively depositing a second hard mask onto the first hard mask at a vertical thickness of about 0.5 W or greater such that the small features are sealed by the second hard mask and the large features are not sealed; exposing the substrate to an etchant such that regions of the substrate corresponding to the large features are etched, while the regions of the surface corresponding to the small features are not etched; and removing the second hard mask; thereby producing a substrate having a patterned hard mask on its surface with etched large features, and un-etched small features.

In some embodiments, between the first hard mask and the substrate is a cladding layer in substantially the same pattern as the first hard mask, further comprising removing the first hard mask, thereby producing a substrate having a patterned cladding on its surface with etched large features, and un-etched small features.

In one aspect the invention provides a micromirror array comprising: a transparent substrate having a top surface and a bottom surface, the top surface having an array of protrusions; a cladding layer on top of each of the protrusions, the cladding layer on each protrusion having at least one nanoscale aperture extending through the cladding layer to the transparent substrate; a reflective layer disposed on the top surface of the substrate, so as not to cover the nanoscale apertures, whereby when light is directed from below the transparent substrate, the protrusions act as micromirrors, directing light to the nanoscale apertures; wherein lateral dimensions of both the protrusions and the nanoscale apertures are defined in a single patterning step.

In some embodiments the transparent substrate comprises a silica-based material. In some embodiments the substrate comprises fused silica.

In some embodiments the nanoscale apertures have a lateral dimension of less than about 500 nm. In some embodiments the array comprises more than 10,000 micromirrors. In some embodiments the nanoscale apertures comprise ZMWs.

In some embodiments the alignment between the nanoscale aperture and the corresponding micromirror is better than for a micromirror array for which lateral dimensions of both the protrusions and the nanoscale apertures are not defined in a single patterning step. In some embodiments the alignment is 10 percent better over 100 micromirrors. In some embodiments the alignment is 20 percent better over 100 micromirrors.

In one aspect the invention provides a system comprising: a transparent substrate having a top surface and a bottom surface, the top surface having an array of protrusions; a cladding layer on top of each of the protrusions, the cladding layer on each protrusion having at least one nanoscale aperture extending through the cladding layer to the transparent substrate; a reflective layer disposed on the top surface of the substrate, so as not to cover the nanoscale apertures, whereby when light is directed from below the transparent substrate, the protrusions act as micromirrors, directing light to the nanoscale apertures; wherein lateral dimensions of both the protrusions and the nanoscale apertures are defined in a single patterning step; a fluid sample in contact with the transparent substrate comprising one or more optical labels; an illumination light source that directs light to the nanoscale apertures; an optical detection system that detects light emitted from one or more optical labels within the nanoscale apertures; and a computer which receives and processes information from the detection system relating to the sample, wherein either the illumination light, the emitted light, or both are directed by the micromirrors.

In some embodiments the sample comprises a template nucleic acid, and the information relating to the sample comprises sequence information. In some embodiments the nanoscale apertures comprise optical confinements.

In one aspect the invention provides a micromirror array comprising: a transparent substrate having a top surface and a bottom surface, the top surface having an array of protrusions; a cladding layer on top of each of the protrusions, the cladding layer on each protrusion having at least one nanoscale aperture extending through the cladding layer to the transparent substrate; a reflective layer disposed on the top surface of the substrate, so as not to cover the nanoscale apertures, whereby when light is directed from below the transparent substrate, the protrusions act as micromirrors, directing light to the nanoscale apertures; a heat-sink layer disposed on top of the reflective layer.

In some embodiments the heat sink layer comprises a metal layer between about 1 micron and about 10 microns in thickness. In some embodiments the heat sink layer comprises a metal layer between about 2 micron and about 6 microns in thickness.

In some embodiments the cladding layer comprises aluminum, and the heat sink layer and the reflective layer comprise gold, silver, chromium, or nickel.

In one aspect the invention provides a method for producing a micromirror array having heat sinks comprising: providing a transparent substrate having etched regions to form an array of protrusions on the surface of the transparent substrate, the protrusions each having a cladding layer on their tops, and the cladding layer having at least one nanoscale aperture on the top of each protrusion; the nanoscale apertures masked by a first resist which has been patterned to have regions extending over the nanoscale apertures; depositing a reflective layer onto the substrate such that the reflective layer has gaps at the edges of regions of the first resist extending over the nanoscale apertures; depositing and patterning a second resist over the regions of first resist, thereby covering the gaps at the edges of regions of the first resist extending over the nanoscale apertures; plating a heat sink layer onto the reflective layer; removing the second resist, first resist, and the portions of the reflective coating on top of the first resist; thereby producing an array of micromirrors, each with a cladding on its top, each with at least one nanoscale aperture on its top, having a heat sink layer extending through the etched regions of the substrate.

In some embodiments the heat sink layer is plated using electroplating or electroless plating. In some embodiments the reflective layer and the heat sink layer comprise the same material.

In some embodiments the reflective layer and the heat sink layer comprise gold, silver, chromium or nickel. In some embodiments, before depositing the reflective layer, an adhesion layer is deposited. In some embodiments the adhesion layer comprises titanium or chromium.

BRIEF DESCRIPTION OF THE DRAWINGS

FIG. 1A-B schematically illustrates an exemplary nucleic acid sequencing process that can be carried out using aspects of the invention.

FIG. 7C, schematically illustrates a structure having a reaction region extending into the micromirror, and illustrates the incorporation of an optical component such as a filter into the micromirror structure.

FIG. 12 schematically illustrates alternate illumination strategies for monitoring discrete illuminated reaction regions on a substrate. FIG. 12A schematically illustrates a flood illumination pattern. FIG. 12B schematically illustrates a scanning approach to illumination. FIG. 12C schematically illustrates a linear illumination pattern. FIG. 12D schematically illustrates a targeted spot array illumination pattern.

DETAILED DESCRIPTION OF THE INVENTION

General

Figure 2:
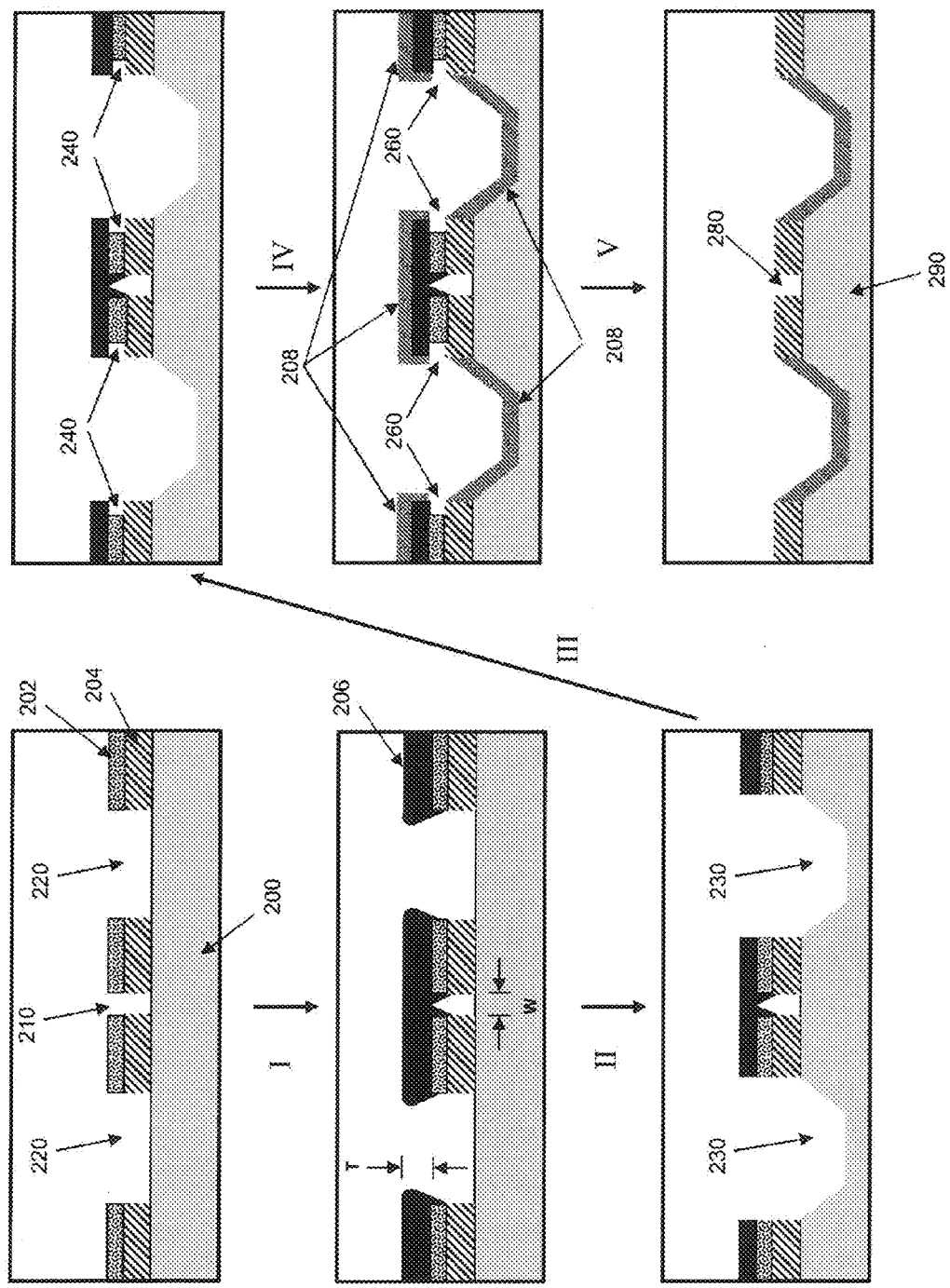
FIG. 2 is a schematic illustration of a method of the invention to produce micromirror arrays having nanostructures on their tops in which small features and large features are defined in a single step, and in which a specifically deposited second hard mask is used to mask the small features to provide for selective etching of the large features.

The methods, arrays, and systems of the present invention are, in some aspects, directed to providing improved multiplexed analytical systems. In particular, the invention provides improved optical performance in the use of arrays of optical confinements. Such arrays are deployed to observe chemical, biological, and biochemical processes, in some cases at the single molecule level.

One aspect of the invention is a method for producing an array of micromirror structures each having a nanostructure on its top. The nanostructure on the top of the micromirror can comprise an optical confinement in which labeled molecules and biomolecules are observed. The labeled molecules can be observed at very low levels, down to the level of a single molecule. The arrays of the invention have micromirror and nanostructures with lateral features which are defined in the same step or series of steps. By forming both sets of structures in the same step or series of steps, the accuracy of the alignment of the features relative to one another can be improved over methods where one set of steps is used to define the micromirror lateral features and another step or series of steps is used to define the nanostructures. The methods eliminate the registration errors encountered when using one mask for small features and another for large features. Increasing the accuracy of alignment of these sets of structures can be important for applications where the micromirror is used to direct light into and/or out of the nanostructure. The same step or series of steps comprise a lithography steps such as one or more of resist exposure, and development. In some cases the lateral dimensions of both the nanostructures and micromirror are formed from the same mask that is used in the exposure of a photoresist. As these features are formed in the same step or series of steps, the features are self-aligned as they are not separately defined, for example, using separate masking steps.

The micromirror arrays are generally formed on a transparent substrate. In an exemplary process, a single step or series of steps is used to provide a transparent substrate having a cladding layer on top of the transparent substrate and a first hard mask layer on the top of the metal cladding layer, where the cladding layer and hard mask layers are patterned to have features extending through both layers to the substrate. The cladding layer and first hard mask will have both small features (which give rise to the nanostructure), and large features (which give rise to the micromirrors). A single photoresist deposition and set of lithography steps can be used to produce this substrate. For example, a transparent substrate such as fused silica will have a metal cladding layer deposited on its surface, and on top of the metal cladding layer is deposited a hard mask material, such as silicon or germanium. Onto this structure is deposited a photoresist. The photoresist is masked, exposed, and developed to form both the small lateral features, corresponding to the nanostructures, and the large lateral features, corresponding to the top of the micromirrors. This patterned structure is then treated to selectively remove both the hard mask layer and the cladding layer in the regions where the photoresist was removed upon development. The etching of the hard mask and the cladding can be carried out in a single etch step or in two separate etch steps. For example, the first a photoresist patterned on the hard mask is used to etch the features on the hard mask, then in a second step, the cladding material is etched using the hard mask material to define the pattern in the cladding layer, etching the regions of the cladding layer not covered by the hard mask.

In the next phase of the process, the small features are masked to protect them from being etched in the etching process used to form the micromirrors. The small features can be masked and protected by a variety of methods. In some embodiments, a selective second hard mask deposition is used to mask the small features. The second hard mask is deposited in a manner such that it deposits substantially only on the first hard mask layer, without depositing onto the transparent substrate. This selective deposition can be accomplished, for example, by chemical vapor deposition (CVD). The second hard mask is deposited at a thickness such that the second hard mask layer extends across the small features, bridging across the feature to close it off, while leaving the large features open. In some embodiments, the small features are masked and protected by a photoresist which is coated onto the surface, selectively exposed, and developed such that the photoresist remains over the region of the surface comprising the small features, but is removed from the regions of the surface comprising the large features.

Once the small features are masked and protected, the transparent substrate is etched to form depressions or trenches in the transparent substrate material. The depressions produce the three dimensional structures corresponding to the micromirror structures. The etching of the transparent substrate can be carried out in order to produce a profile structure to form, for example a conical or parabolic micromirror structure. The use of etching to produce profiled features is well known in the art.

The next aspect of the process is the deposition of a reflective material into the features produced during etching, which include the reflective side-walls of the micromirrors. For this aspect of the process, the reflective material is deposited in a manner which allows for the subsequent removal of the layers now covering the small features. For the methods of the invention, this is accomplished by undercutting the first hard mask layer, forming a recess underneath the second hard mask or photoresist, such that when the reflective material is deposited, there is a discontinuity in the reflective coating at the edge of the large features for the hard mask, or between the large features and small features at the edge of the photoresist. This discontinuity allows for reagents to penetrate into the first hard mask in order to facilitate removal and lift-off from the substrate. The first hard mask is recessed underneath a layer on top of the first hard mask. In some embodiments, the layer on top of the first hard mask is the second hard mask and the discontinuity is at the edge of the large features in between the first and second hard masks. In other embodiments, such as the embodiment in which photoresist is used to mask and protect the small features during etching, the discontinuity is underneath the edge of the photoresist in between the photoresist and the hard mask.

After undercut of the first hard mask, a reflective material is deposited onto the surface of the substrate. The deposition is generally carried out in a conformal manner. The reflective material is deposited in a manner in which the reflective coating contacts the side walls of the cladding, but which does not coat the undercut side walls of the first hard mask, resulting in a discontinuity of the reflective material at the regions of the substrate where the first hard mask has been undercut. In some cases the conformal coating of the reflective material is accomplished using physical vapor deposition such as sputtering or evaporation.

The layers which are covering the small features on the substrate can now be removed. This removal is accomplished by delivering a material that will dissolve or degrade the first hard mask material and the second hard mask material or photoresist. The removal of these layers will result in the lift-off of the layers on top of the first hard mask including removal of the reflective material in the regions of the substrate comprising the small features where the reflective material has been deposited on top of the first hard mask, and second hard mask or photoresist.

The substrate can now be cleaned, for example by washing and/or ashing. The result of the process is an array of micromirrors, each having at least one small feature on the top surface of the micromirror. The small feature or nanostructure can comprise, for example, an optical confinement. The large features comprising the micromirrors and the small features comprising the optical confinements have been produced in a manner such that they are accurately aligned with respect to each other.

Another aspect of the invention is a method for selectively etching large features without etching small features on the same substrate. The method can be used as part of a process for producing micromirror arrays, and can also be used for many other applications which have large etched features in the presence of smaller features. It can be used, for example, to prepare interdigitated electrodes having regions where the electrodes are separated by a small distance and also have regions where the electrodes are separated by large distances where the substrate is etched. The substrate need not be transparent, and could be any suitable substrate including a semiconductor such as silicon or metal. A substrate is provided which has a patterned first hard mask on its surface. The pattern has both small features and large features. The small features have a lateral dimension that is W or less, and the smallest lateral dimensions large features are greater than about W. Onto the first hard mask is selectively deposited a second hard mask. The second hard mask deposits onto the first hard mask, but not onto the exposed portions of the substrate. The second hard mask is deposited at a thickness of about 0.5 W or greater. The deposition is carried out in a manner in which the second hard mask grows laterally from the first hard mask as well as growing vertically. At a thickness of about 0.5 W or greater, the second hard mask bridges across the small features, closing them off.

In the following step, the exposed portions of the surface corresponding to the large features are exposed to an etchant such that depressions or trenches are formed in the substrate. The etching can be done in a manner to provide either straight or profiled walls, depending on the intended application. The second hard mask can then be removed to expose the small features in the small hard mask layer, thus producing a substrate having patterned on its surface a first hard mask layer having small features within which the substrate is not etched, and large features, within which the substrate is etched.

In some cases, there are additional layers between the substrate and the first hard mask. For example, in some cases, there is a layer of cladding material that is patterned to the same lateral dimensions as the first hard mask layer. The substrate is treated as described above, and, in addition, the first hard mask is removed. This variation of the method provides a substrate having an intermediate layer, such as a cladding layer in a pattern on the substrate wherein the substrate is not etched between in the region within the small features, but are etched in the regions comprising the large feature.

Multiplexed optical analytical systems are used in a wide variety of applications. Such applications can include the analysis of single molecules, and can involve Observing, for example, single biomolecules in real time as they undergo reactions. For ease of discussion, such multiplexed systems are discussed herein in terms of a preferred application: the analysis of nucleic acid sequence information, and particularly, single molecule nucleic acid sequence analysis. Although described in terms of a particular application, it should be appreciated that the applications for the systems of the invention are of broader application.

In the context of single molecule nucleic acid sequencing analyses, a single immobilized nucleic acid synthesis complex, comprising a polymerase enzyme, a template nucleic acid, whose sequence one is attempting to elucidate, and a primer sequence that is complementary to a portion of the template sequence, is observed to identify individual nucleotides as they are incorporated into the extended primer sequence. Incorporation is typically monitored by observing an optically detectable label on the nucleotide, prior to, during or following its incorporation. In some cases, such single molecule analyses employ a "one base at a time approach", whereby a single type of labeled nucleotide is introduced to and contacted with the complex at a time. Upon incorporation, unincorporated nucleotides are washed away from the complex, and the labeled incorporated nucleotides are detected as a part of the immobilized complex.

In some instances, only a single type of nucleotide is added to detect incorporation. These methods then require a cycling through of the various different types of nucleotides (e.g., A, T, G and C) to be able to determine the sequence of the template. Because only a single type nucleotide is contacted with the complex at any given time, any incorporation event is by definition, an incorporation of the contacted nucleotide. These methods, while somewhat effective, generally suffer from difficulties when the template sequence includes multiple repeated nucleotides, as multiple bases may be incorporated that are indistinguishable from a single incorporation event. In some cases, proposed solutions to this issue include adjusting the concentrations of nucleotides present to ensure that single incorporation events are kinetically favored.

In other cases, multiple types of nucleotides are added simultaneously, but are distinguishable by the presence on each type of nucleotide of a different optical label. Accordingly, such methods can use a single step to identify a given base in the sequence. In particular, all four nucleotides, each bearing a distinguishable label, are added to the immobilized complex. The complex is then interrogated to identify which type of base was incorporated, and as such, the next base in the template sequence.

In some cases, these methods only monitor the addition of one base at a time, and as such, they (and in some cases, the single nucleotide contact methods) require additional controls to avoid multiple bases being added in any given step, and thus being missed by the detection system. Typically, such methods employ terminator groups on the nucleotide that prevent further extension of the primer once one nucleotide has been incorporated. These terminator groups are typically removable, allowing the controlled re-extension after a detected incorporation event. Likewise, in order to avoid confounding labels from previously incorporated nucleotides, the labeling groups on these nucleotides are typically configured to be removable or otherwise inactivatable.

In another process, single molecule primer extension reactions are monitored in real-time, to identify the continued incorporation of nucleotides in the extension product to elucidate the underlying template sequence. In such single molecule real time (or SMRT™) sequencing, the process of incorporation of nucleotides in a polymerase mediated template dependent primer extension reaction is monitored as it occurs. In preferred aspects, the template/polymerase primer complex is provided, typically immobilized, within an optically confined region, such as a zero mode waveguide, or proximal to the surface of a transparent substrate, optical waveguide, or the like (see e.g., U.S. Pat. Nos. 6,917,726, and 7,170,050 and Published U.S. Patent Application No. 2007-0134128, the full disclosures of which are hereby incorporated herein by reference in their entirety for all purposes). The optically confined region is illuminated with an appropriate excitation radiation for the fluorescently labeled nucleotides that are to be used. Because the complex is within an optically confined region, or very small illumination volume, only the reaction volume immediately surrounding the complex is subjected to the excitation radiation. Accordingly, those fluorescently labeled nucleotides that are interacting with the complex, e.g., during an incorporation event, are present within the illumination volume for a sufficient time to identify them as having been incorporated. A schematic illustration of this sequencing process is shown in FIG. 1. As shown in FIG. 1A, an immobilized complex 102 of a polymerase enzyme, a template nucleic acid and a primer sequence are provided within an observation volume (as shown by dashed line 104) of an optical confinement, of e.g., a zero mode waveguide 106. As an appropriate nucleotide analog, e.g., nucleotide 108, is incorporated into the nascent nucleic acid strand, it is illuminated for an extended period of time corresponding to the retention time of the labeled nucleotide analog within the observation volume during incorporation which produces a signal associated with that retention, e.g., signal pulse 112 as shown by the A trace in FIG. 1B. Once incorporated, the label that attached to the polyphosphate component of the labeled nucleotide analog, is released. When the next appropriate nucleotide analog, e.g., nucleotide 110, is contacted with the complex, it too is incorporated, giving rise to a corresponding signal 114 in the T trace of FIG. 1B. By monitoring the incorporation of bases into the nascent strand, as dictated by the underlying complementarity of the template sequence, one can obtain long stretches of sequence information of the template. Further, in order to obtain the volumes of sequence information that may be desired for the widespread application of genetic sequencing, e.g., in research and diagnostics, higher throughput systems are desired.

By way of example, in order to enhance the sequencing throughput of the system, multiple complexes are typically monitored, where each complex is sequencing a separate template sequence. In the case of genomic sequencing or sequencing of other large DNA components, these templates will typically comprise overlapping fragments of the genomic DNA. By sequencing each fragment, one can then assemble a contiguous sequence from the overlapping sequence data from the fragments. In preferred aspects, the various different complexes are provided arrayed upon a substrate. Such arrayed complexes may be provided within optically or structurally confined structures, e.g., zero mode waveguides, or they may be patterned on a surface. Alternatively, they may be randomly disposed over a surface but subjected to targeted arrayed illumination, or detection, such that only complexes within an array pattern on the surface are monitored. For purposes of discussion herein, both configurations are referred to herein as the monitoring of arrayed complexes, or the like.

Arrays of optical confinements can have improved optical performance when the optical confinements are situated within a micromirror structure to increase the amount of input light that reaches the optical confinement and/or to increase the amount of emitted light from the optical confinement that reaches the detector. The methods, arrays, and systems of the invention provide for optical confinements accurately disposed within their corresponding micromirrors for improved performance and consistency.

FIG. 2 shows a schematic illustration of an embodiment of a process of the invention for forming an array of micromirrors. A transparent substrate 200 is provided which has a cladding layer 204 on top of it and a first hard mask layer 202 on top of the cladding layer 204. In some cases the layers are in direct contact as shown here. In other cases, there can be intervening layers between the layers. The cladding and first hard masks are patterned to approximately the same lateral dimensions. The layers have small features 210 and large features 220 which are defined in the same step or same series of steps. For example, the small features 210 and large features 220 can be defined in one set of lithography steps comprising depositing a resist, exposing the resist, and developing the resist, followed by one or more etching steps to remove the first hard mask 202 and cladding 204 in the regions where the resist was removed upon development. The hard mask and the cladding layer can be etched in the same step, for example with $Cl_2$ where the cladding comprises Al, and the hard mask layer on the cladding comprises Si, Ge, SiGe, or chrome.

In some cases the first hard mask layer and cladding layer are etched in separate steps involving first etching the first hard mask layer, stripping the resist, then etching the cladding layer using the first hard mask layer to control the etching of the cladding layer. The use of the hard mask layer for masking the cladding layer during etching of the cladding layer can provide a less corrosive process than using a resist for masking, as the resist developing and stripping process can result in corrosion, pitting, and pinholes in the cladding layer, for example when the cladding layer comprises a metal such as aluminum or silver. In addition, we have found that the hard mask layer, when comprising silicon, germanium, or silicon-germanium can act as an antireflective coating, eliminating the need for a BARC layer, which in some cases is required for producing small features in the cladding layer.

When developing the cladding layer using the first hard mask layer, a process of gap tuning by etch can be employed in order to impart smaller features on the cladding layer than those which were produced at the top of the first hard mask layer. Gap tuning by etch can be accomplished where the etching of the hard mask layer results in tapered, rather than straight walls. To the extent that the walls are tapered, the portions of the cladding layer which are exposed will be smaller than the openings at the top of the hard mask layer. The features at the bottom of the hard mask layer can be used to define the features created in the cladding layer, resulting in structures in the cladding layer that are smaller than those produced at the top of the first hard mask layer.

In some cases the small features are apertures having a circular in cross-section. The small features can be any suitable shape including, for example an ellipse, square, rectangle, or strip. The small features 210 are generally nanoscale features having a lateral dimension that is less than about 500 nm. The small features can comprise a nanoscale reaction region or an optical confinement in the final array. The small features 210 may have a lateral dimension between about 10 nm and about 500 nm or from about 20 nm to about 200 nm. The large features 220 will, in some cases, have features that are significantly larger than those of the small features. The large features have a smallest lateral dimension that is generally at least 1.5, at least 2, at least 3, at least 5, at least 10, at least 20, at least 50, or at least 100 times the smallest lateral dimension of the nanoscale region.

In step (I) a second hard mask 206 is selectively deposited onto the first hard mask 202. The second hard mask is selectively deposited such that it deposits onto the first hard mask, but does not substantially deposit on the substrate. Such a selective deposition can be obtained, for example using chemical vapor deposition (CVD). The second hard mask is deposited in a manner such that the second hard mask extends laterally as well as vertically from the first hard mask. The second hard mask is deposited at a thickness T which is selected such that the second hard mask bridges across the small features in order to mask and protect them during subsequent etching steps. In some embodiments, the small features have a dimension W, and the second hard mask is deposited at a thickness T of at least 0.5 W. The second hard mask is deposited such that:

$T \geq W/2$

The second hard mask does not extend across the large features on the substrate leaving them susceptible to etching.

In step (II) the substrate is etched within the large features to form depressions 230 in the substrate. The etching is generally performed such that profiled, rather than vertical walls are formed. Such profiled walls will generally provide superior micromirror performance to vertical walls. The angle, shape, and roughness of the profiled walls can be selected for improved micromirror performance. The selection of the etch depth, the angles of the profiles, and the shape of the walls for controlling the micromirror properties is described in more detail below. Etching can be performed by wet etching or dry etching processes. The etching method will generally be performed such that there is a high selectivity between the etching rate of the substrate and that of the second hard mask.

In step (III), undercut of the first hard mask layer is performed. The undercut process is selected to selectively remove the first hard mask layer in the presence of the second hard mask, the cladding, and the substrate. In order to perform this undercut, the material that comprises the first hard mask layer is generally different than the material comprising the second hard mask layer. In some cases, for example, the first hard mask comprises Ge, and the second hard mask comprises a silicon/germanium material, for example, a $Si_xGe_{1-x}$ compound, where $0<x<1$. For these materials; hydrogen peroxide can be used to selectively etch the first hard mask, for example where the first hard mask comprises Ge, and where x is between 0.6 and 1. Above about x=0.6, the SiGe is much less susceptible to hydrogen peroxide etching. When X gets closer to 1, the processing temperature for the SiGe goes up. Thus, in some cases x is between about 0.6 and about 0.8 is used. The undercut is performed to produce undercut gaps 240, such that when the reflective layer is deposited, there will be a discontinuity in the reflective layer at the gaps 240, allowing for etching reagents to reach the first hard mask for removal of the hard mask and lift-off of the portions of the reflective layers over the small features. The amount of undercut can be, for example, at least about the same distance as the thickness of the first hard mask, about twice the thickness of the first hard mask, or about three times the thickness of the first hard mask.

In step (IV), a reflective layer 208 is deposited. The deposition of the reflective layer is generally carried out in a conformal manner. The deposition of the reflective coating is done such that there are discontinuities 260 in the reflective coating corresponding to the gaps 240 created in the undercut step. The reflective material can be a metal. In some cases, the reflective material is or comprises the same material as the cladding. The reflective layer and the cladding can each, for example, comprise aluminum.

In step (V), the first hard mask, the second hard mask, and the portion of the reflective layer that was covering the second hard mask are removed. This can be performed by etching of the first hard mask resulting in lift-off of the second hard mask and the portion of the reflective layer on top of the second hard mask. The etching process is carried out with reagents that are selective to removing the first hard mask in the presence of the cladding and reflective layers without significantly removing the cladding and reflective layers. The etching process for this step can be a process that concurrently etches the second hard mask and the first hard mask. In some cases, for example, when silicon or germanium comprises the hard-mask, this step can be accomplished with a dry etch comprising xenon difluoride ($XeF_2$), or sulfur hexafluoride ($SF_6$). Alternatively, the etching process can be a process that selectively etches the first hard mask, followed by a process that etches the second hard mask. In some cases, when germanium comprises the first hard-mask and silicon germanium the second hard mask, this step can be accomplished with a wet etch comprising hydrogen peroxide ($H_2O_2$) to remove Ge, followed by xenon difluoride ($XeF_2$), or sulfur hexafluoride ($SF_6$) to remove SiGe. Step (V) can also include clean up steps to remove foreign matter from the substrate, such as washing and/or ashing.

The process produces a substrate 290 that has been etched to create three dimensional features, or protrusions, formed to act as micromirrors, wherein on the top of each of the micromirror structures is at least one nanostructure 280. The nanostructures can be, for example apertures, holes, or slits in the cladding material that extends to the top of the substrate. The process allows for the cladding layer and the reflective layer to be touching or overlapping such that there are substantially no gaps between the reflective layer and cladding layer. The arrays of micromirror structures can be used as described herein to monitor biological reactions delivered from above the substrate and occurring within the nanostructures, wherein light extending into and/or out of the nanostructures is directed by the micromirrors.

The process has a number of advantages over other processes. The process allows for deep etching into the substrate by using a relatively thick second hard mask, while the first hard mask can be relatively thin in order to effectively define fine features. In some cases the depth of etching is on the order of 0.5 micron to 10 micron or 1 micron to 5 micron. In some cases the depth is greater, for example from 10 micron to about 50 micron or greater. The use of the first hard mask for etching can have advantages over a process in which the cladding patterned and etched using a resist directly on top of the cladding. In some cases, a photoresist, and the processes used to develop and remove the photoresist can result in corrosion of a metal cladding layer. By using a hard mask as silicon or germanium or a combination of silicon and germanium, the cladding can be etched under conditions whereby there is substantially no corrosion of the metal cladding.

Figure 3A:
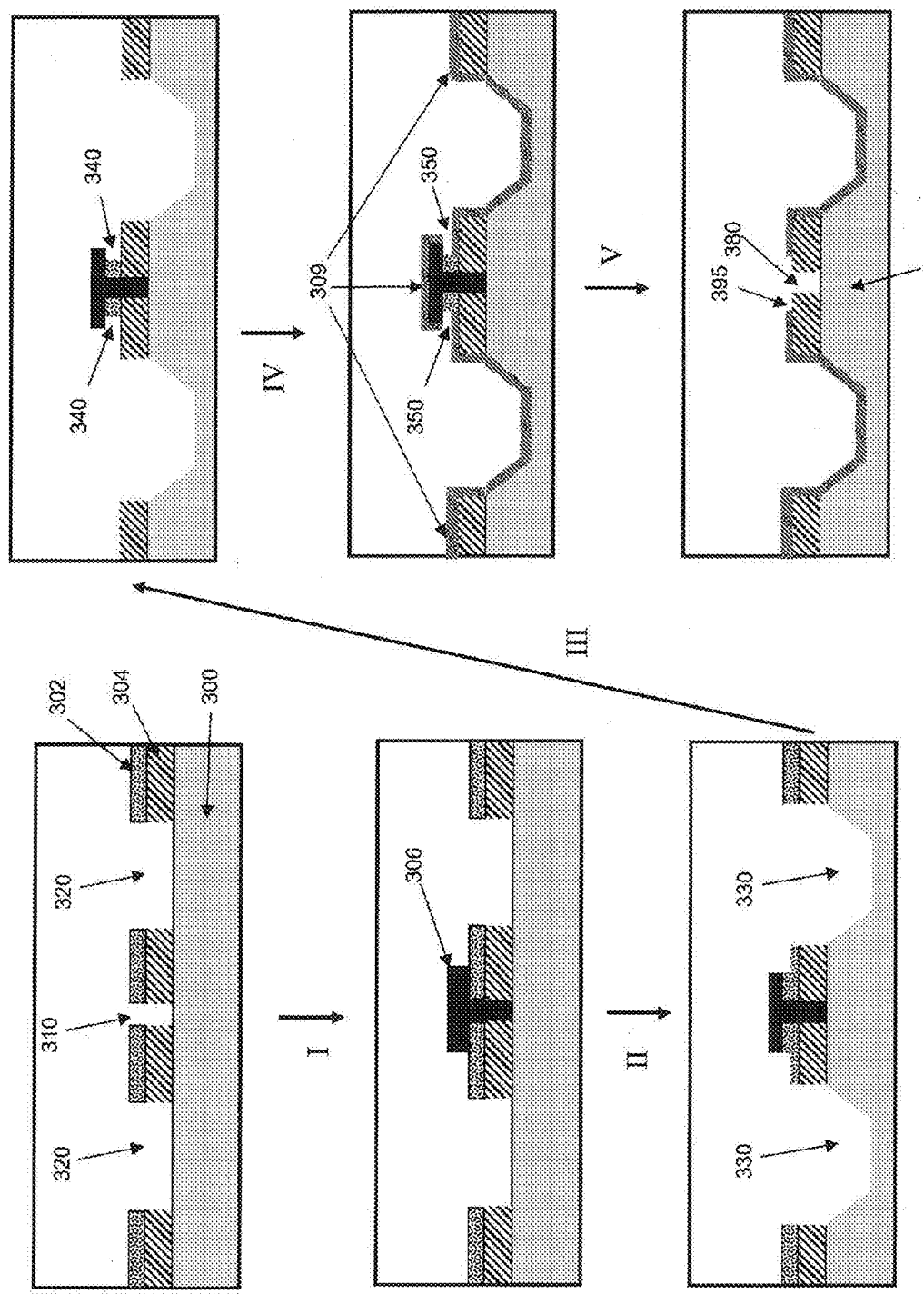
FIG. 3A is a schematic illustration of a method of the invention to produce micromirror arrays having nanostructures on their tops in which small features and large features are defined in a single step, and in which a resist is deposited, exposed, and developed to mask the small features to provide for selective etching of the large features.

FIG. 3A shows an alternative process of the invention for producing micromirror structures having nanostructures on their tops. A transparent substrate 300 is provided which has a cladding layer 304 on top of it and a hard mask layer 302 on top of the cladding layer 304. In some cases the layers are in direct contact as shown here. In other cases, there can be intervening layers between the layers. The cladding and hard mask are patterned to the same lateral dimensions. The layers have small features 310 and large features 320 which are defined in the same step or same series of steps. For example, the small features 310 and large features 320 can be defined in one set of lithography steps comprising depositing a resist, exposing the resist, and developing the resist, followed by one or more etching steps to remove the hard mask 302 and cladding 304 in the regions where the resist was removed upon development. Generally the hard mask layer and cladding layer are developed in separate steps involving first etching the hard mask layer, removing the resist, then etching the cladding layer using the hard mask layer to control the etching of the cladding layer.

In some cases the small features are apertures that are circular in cross-section. The small features can have any suitable shape including, for example an ellipse, square, rectangle, or a strip. The small features 310, generally nanoscale features, have a lateral dimension that is less than about 500 nm. The small features can comprise a nanoscale reaction region or an optical confinement in the final array. The small features 310 may have a lateral dimension between about 10 nm and about 500 nm or from about 20 nm to about 200 nm. The large features 320 will, in some cases, have features that are significantly larger than those of the small features. The large features have a smallest lateral dimension that is generally at least 1.5, at least 2, at least 3, at least 5, at least 10, at least 20, at least 50, or at least 100 times the smallest lateral dimension of the nanoscale region.

In step (I) a resist 306 is deposited on the surface of the hard mask so as to cover the small features and leaving open the large features. This can be accomplished, for example with a photoresist which is deposited over the first surface, exposed using a mask, and developed to leave the photoresist only in the desired regions. The desirability of defining both the small features and large features in the same step to improve the accuracy of alignment has been described. In this process, the lateral dimensions of the resist 306 are not defined in the same step as the step defining the small and large features, and therefore, the alignment may not be as precise. The process is designed, however, such that this lack of alignment will not significantly affect the performance of the array. The edges of the resist do not define critical features. So as long as the resist reliably covers and protects the small features without blocking the large features, the dimensions and location of the resist need not be controlled as precisely as the dimensions of the small and large features. The resist is deposited to leave some of the hard mask exposed at the edges of the large features. This allows for the dimension of the large features 320 to be defined only by the edges of the hard mask 302, self-aligned to small features 310.

In step (II) the substrate is etched within the large features to form depressions 330 in the substrate. The etching is generally performed such that profiled, rather than straight walls are formed. Such profiled walls will generally provide superior micromirror performance to straight walls. The angle and shape of the profiled walls can be selected for improved micromirror performance. The selection of the etch depth, the angles of the profiles, and the shape of the walls for controlling the micromirror properties is described in more detail below. Etching can be performed by wet etching or dry etching processes. The etching method will generally be performed such that there is a high selectivity between the etching rate of the substrate and that of the hard mask.

In step (III), the hard mask layer is undercut. The undercut leaves the metal and photoresist layers over-hanging the hard mask. The undercut process is selected to selectively remove the hard mask layer in the presence of the cladding and the substrate. In some cases the hard mask comprises Ge. Hydrogen peroxide, or $XeF_2$ can be used to selectively etch the hard mask. In some cases the hard mask comprises amorphous Si. $XeF_2$ can be used to selectively etch the hard mask. The undercut is performed to produce undercut gaps 340, such that when the reflective layer is deposited, there will be a discontinuity in the reflective layer at the gaps 340, allowing for etching reagents to reach the hard mask for removal of the hard mask and lift-off of the portions of the reflective layer over the small features. The amount of undercut can be, for example, at least about the same distance as the thickness of the hard mask, about twice the thickness of the hard mask, or about three times the thickness of the hard mask.

In step (IV), a reflective layer 309 is deposited. The deposition of the reflective layer is generally carried out in a conformal manner. The deposition of the reflective coating is done such that there are discontinuities 350 in the reflective coating corresponding to the gaps 340 created in the undercut step. The reflective material can be a metal. In some cases, the reflective material is or comprises the same material as the cladding. The reflective layer and the cladding can each, for example, comprise aluminum.

In step (V), the hard mask, the metal layer, and the portion of the reflective layer that was covering the photoresist are removed. This can be performed by etching of the hard mask and/or the photoresist, resulting in lift-of the portion of the reflective layer on top of the photoresist. The etching process is carried out with reagents that are selective to removing the hard mask and/or the photoresist in the presence of the cladding and reflective layers without significantly removing the cladding or removing the reflective layers over the large features. In some cases, this step can be accomplished with a wet etch comprising hydrogen peroxide ($H_2O_2$) to remove Ge hard mask or $XeF_2$ or $SF_6$ dry etch to remove Ge or Si hard mask, followed by dissolving in acetone, or any photoresist stripper with or without ultrasonic agitation. This step can also be accomplished by dissolving in acetone, or any photoresist stripper with or without ultrasonic agitation, followed by a wet etch comprising hydrogen peroxide ($H_2O_2$) to remove Ge hard mask or $XeF_2$ or $SF_6$ dry etch to remove Ge or Si hard mask. Step (V) can also include clean up steps to remove foreign matter from the substrate, such as washing and/or ashing. Feature 395 defines the edge of the reflective layer 309 on the top of the micromirror.

The process results in a substrate 390 that has been etched to create three dimensional features, or protrusions, which are designed to act as micromirrors, wherein on the top of each of the micromirror structures is at least one nanostructure 380. The nanostructures can be, for example apertures, holes, or slits in the cladding material that extends to the top of the substrate. The process allows for the cladding layer and the reflective layer to be touching or overlapping such that there are substantially no gaps between the reflective layer and cladding layer. The arrays of micromirror structures can be used as described herein to monitor biological reactions delivered from above the substrate and occurring within the nanostructures, wherein light extending into and/or out of the nanostructures is directed by the micromirrors.

In some aspects, the invention comprises heat sink structures integral to the substrate. Heat sink structures integral to the substrate can be desirable for maintaining the temperature within the nanoscale aperture, in particular, where the arrays of the invention are employed as analytical systems to measure biochemical reactions such as the sequencing reaction of a polymerase enzyme. As described herein, the micromirrors can focus illumination radiation onto the small regions of the surface in which the nanoscale apertures reside. This can result in a high photon flux and a resultant influx of heat into these regions. The heat influx can result in an increase in the local temperature if the heat is not dissipated. In some cases, even a slight rise in temperature is undesirable, as the performance of biochemical reactions of interest can be temperature sensitive. In some cases, heat transfer through the substrate, the cladding layer, and the solution in contact with the apertures is sufficient to control heat flow for temperature control. In other cases, the addition of a thermally conductive heat sink layer on top of the substrate can be used to improve the thermal management of the nanoscale aperture regions. For maximizing heat conduction, it is desired that the heat sink layer be in intimate contact with the substrate and/or the cladding. It is important that the heat sink layer not interfere with the function of the nanoscale aperture, especially that it does not close or constrict the opening of the nanoscale aperture to the analysis solution. The methods and arrays of the invention can include steps that result in the formation of an integral heat sink layer on the substrate.

In some cases, the methods of the invention utilize the selective deposition of a heat sink layer onto the top of a reflective layer that has been deposited onto an etched substrate, for example, as described herein. Such selective deposition can be carried out, for example with electroplating or electroless plating.

Figure 3B:
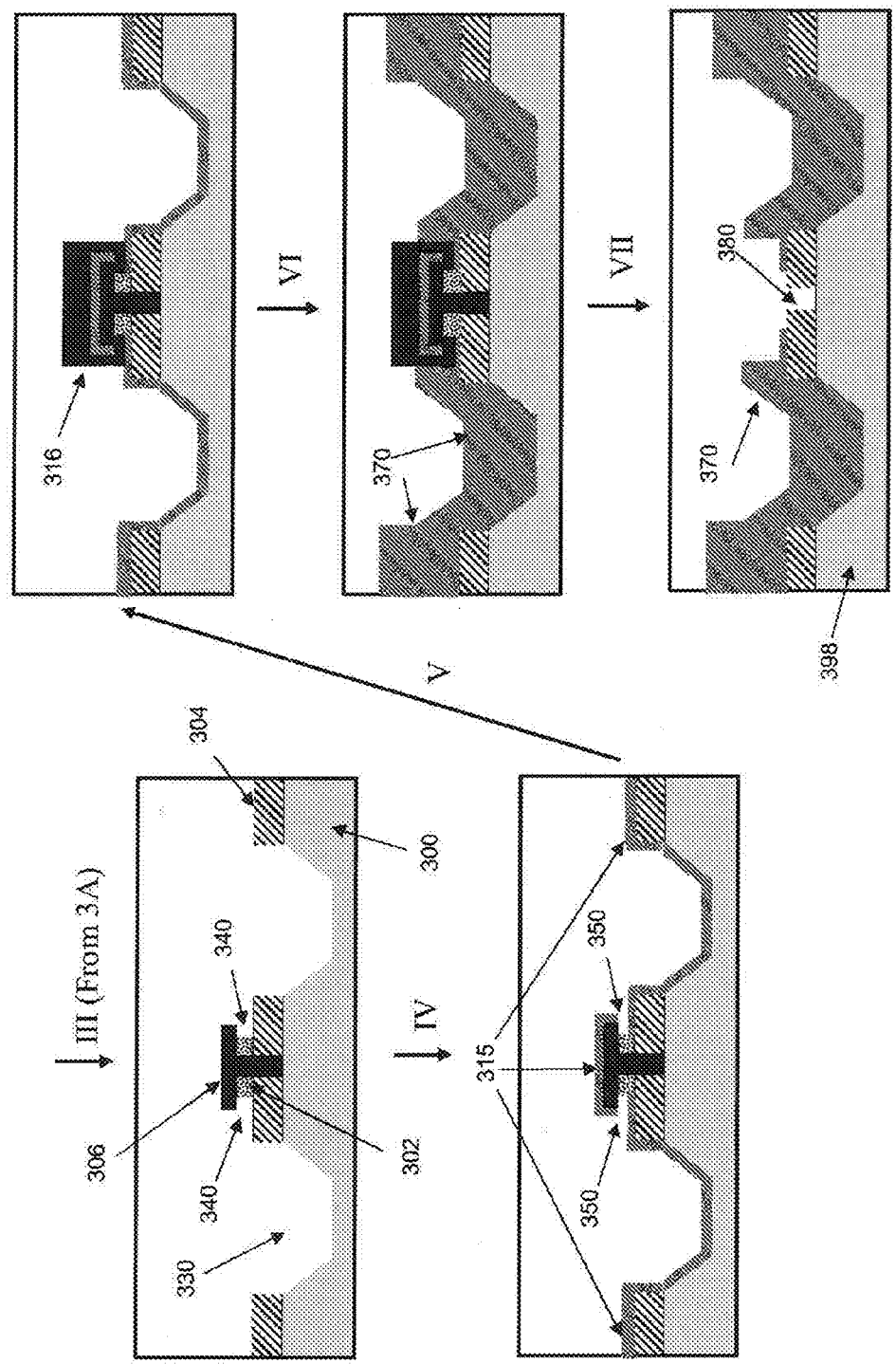
FIG. 3B is a schematic illustration of a method of the invention to produce micromirror arrays having nanostructures on their tops and having heat sink structures over the reflective layer of the micromirror array.

FIG. 3B shows an example of the deposition of a heat sink layer onto the substrate in conjunction with the methods and arrays of the invention. In FIG. 3B, step III is carried out as described for step III in FIG. 3A. Step III results in a the formation of a transparent substrate 300 having etched regions 330 forming protrusions having cladding 302 on their tops, the cladding having at least one nanoscale aperture on the top of each protrusion, the nanoscale aperture covered by a first resist 306. In-between the resist 306 and the cladding 302 is a hard mask having holes corresponding to the openings in the nanoscale apertures, the hard mask layer having been undercut below the edges of the photoresist.

In step IV, a reflective layer 315 is deposited on the substrate such that gaps 350 are formed at the edges of the regions covered by the first photoresist. The reflective layer is generally deposited in a conformal manner, for example, by physical vapor deposition or sputtering. In some cases, a relatively thin adhesion layer, for example of Ti or Cr is first deposited before the deposition of the reflective layer in order to promote adhesion to the substrate and/or the cladding. The thickness of the adhesion layer can be, for example, between 5 nm and 20 nm, in some cases about 10 nm. Where, as in this process, the reflective layer is subsequently coated with a heat sink layer, a major purpose of the reflective layer is to act as a seed layer for the heat sink layer deposition. Therefore, the thickness can be any thickness that will act as a seed layer, for example from about 50 nm to about 200 nm.

In step V, a second resist 316 is patterned on top of the regions covered by the first resist, covering the reflective coating in these portions of the substrate. The second resist is generally deposited, patterned, and developed such that the second resist covers the edges of the first photoresist, covering the gaps between the reflective layer on the cladding and the reflective layer on the top of the first resist.

In step VI, the heat sink layer 370 is deposited selectively onto the reflective layer, for example by electroplating. The heat sink layer 370 can also be deposited, in some cases using electroless deposition. The heat sink layer 370 is generally deposited at a thickness that is greater than that of the cladding material. The thickness of the heat sink layer can be, for example from about 1 micron to about 10 microns, or about 2 microns to about 6 microns. Where the heat sink layer is electrodeposited, the material comprising the heat sink layer typically comprises a metal. In some cases, the heat sink layer is comprised of the same as the material as that comprising the reflective layer. The reflective layer and/or the heat sink layer can be or comprise, for example, Au, Ag, Cr, Ni, Cr, Pt, Mo, or Al.

In step VII, the first resist, second resist, and the portion of the reflective layer on top of the first resist are removed. The removal may be done in several steps, for example, one step to remove the second resist, another step to remove the conductive layer over the first resist, and one step to remove the first resist and clean the surface. In some cases, the process for removing the reflective layer over the first resist will also result in some etching or removal of the heat sink layer. This is generally acceptable, as the thickness of the portion of the reflective layer to be removed is relatively thin, and the removal of a comparable thickness of the heat sink layer will not adversely affect performance and can be taken account of in the process. The process produces transparent substrate 398 having etched regions and micromirrors structures having nanoscale apertures 380 on their tops, and having the relatively thick heat sink layer 370 on the top of the reflective layer.

Figure 4:
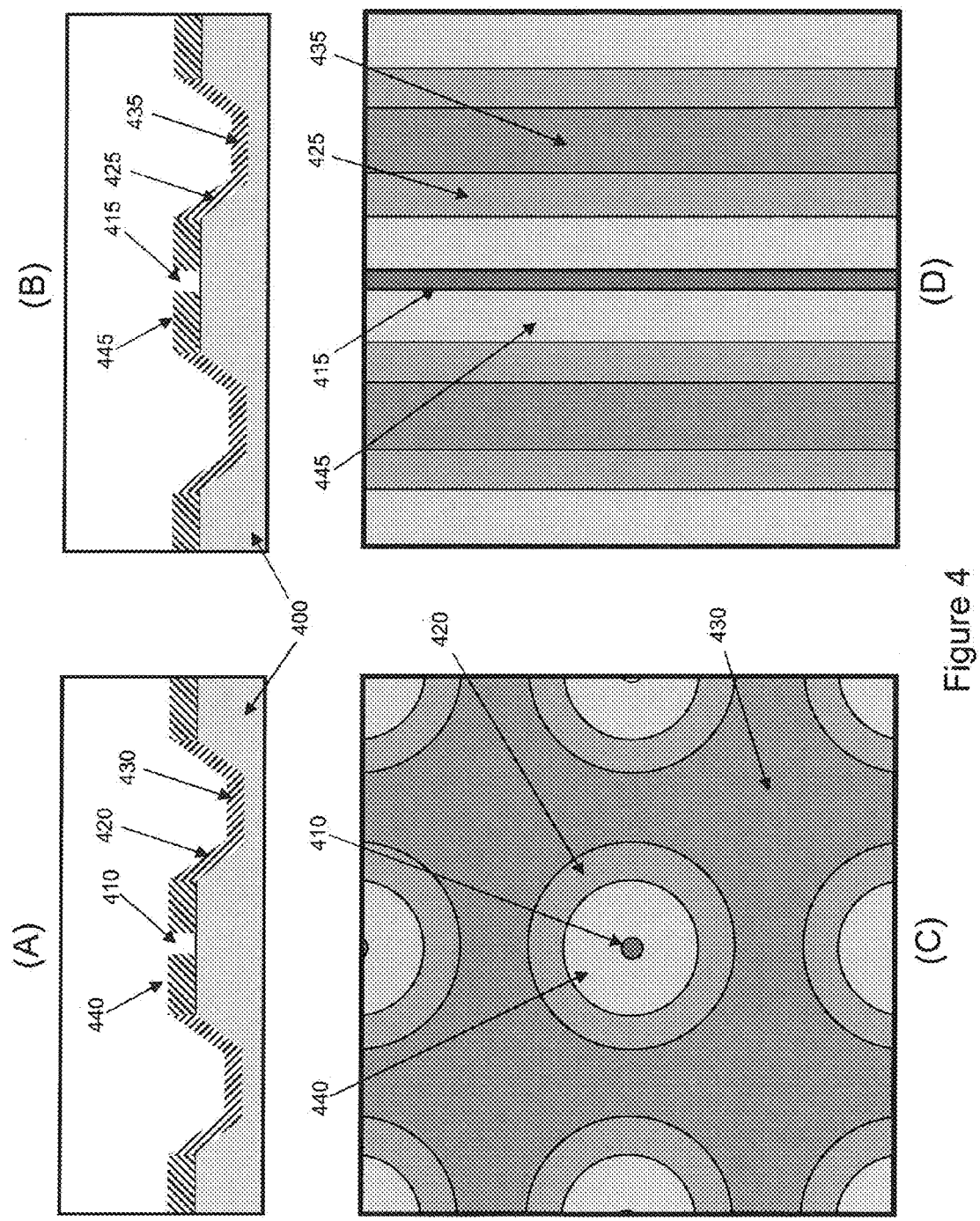
FIGS. 4A and 4B show cross sections and FIGS. 4C and 4D show top views of micromirror arrays with nanostructures on the tops of micromirrors.

FIGS. 4(A) and 4(C) show a cross-sectional view and a top view of a micromirror array of the invention in which the micromirrors structures in the array comprise circularly symmetrical mirrors. The micromirrors have side walls 420 and are separated by etched regions 430. Each micromirror has a nanoscale aperture 410 in the cladding on its top surface 440.

FIGS. 4(B) and 4(D) show a cross-sectional view and a top view of a micromirror array of the invention in which the micromirrors structures in the array comprise linearly symmetrical mirrors. The micromirrors have side walls 425 and are separated by etched regions 435. Each micromirror has a nanoscale slit 415 in the cladding on its top surface 445. While the figures show circular mirrors having nanoscale apertures, and linear mirrors having nanoscale slits, the invention provides for micromirrors and nanoscale structures having any other suitable symmetry including triangular, elliptical, square, or rectangular.

The dimensions of the micromirror structure are produced to improve the amount of light directed to the nanostructure and/or the amount of light detected from the light emitted from the microstructure over the case where no micromirror is present. In some cases, the nanostructure 410 is a nanoscale aperture with a diameter of between about 50 nm and about 200 nm, the width of the micromirror at its top is between about 1.5 micron and about 4 micron, the width of the micromirror at its base is between about 3 micron and about 10 micron, and the height of the micromirror is between about 3 micron and about 10 micron. The width of the base is generally larger than the width of the top of the micromirror structure. The side walls of the micromirror can be substantially straight, and the angle between the sidewall and the normal to the surface is between about 5 degrees and about 45 degrees. In some cases, the nanostructure 410 is a nanoscale aperture with a diameter of between about 80 nm and about 150 nm, the width of the micromirror at its top is between about 2.5 micron and about 3.5 micron, the width of the micromirror at its base is between about 5 micron and about 6.5 micron, and the height of the micromirror is between about 5 micron and about 6 micron; and the width of the base is larger than the width of the top of the micromirror structure, and side walls of the micromirror are substantially straight, and the angle between the sidewall and the normal to the surface is between about 20 degrees and about 30 degrees.

The nanostructures can comprise optical confinements having non-reflective coatings on their walls as described in co-pending U.S. Patent Application 61/241,700 filed Sep. 11, 2009.

Figure 5:
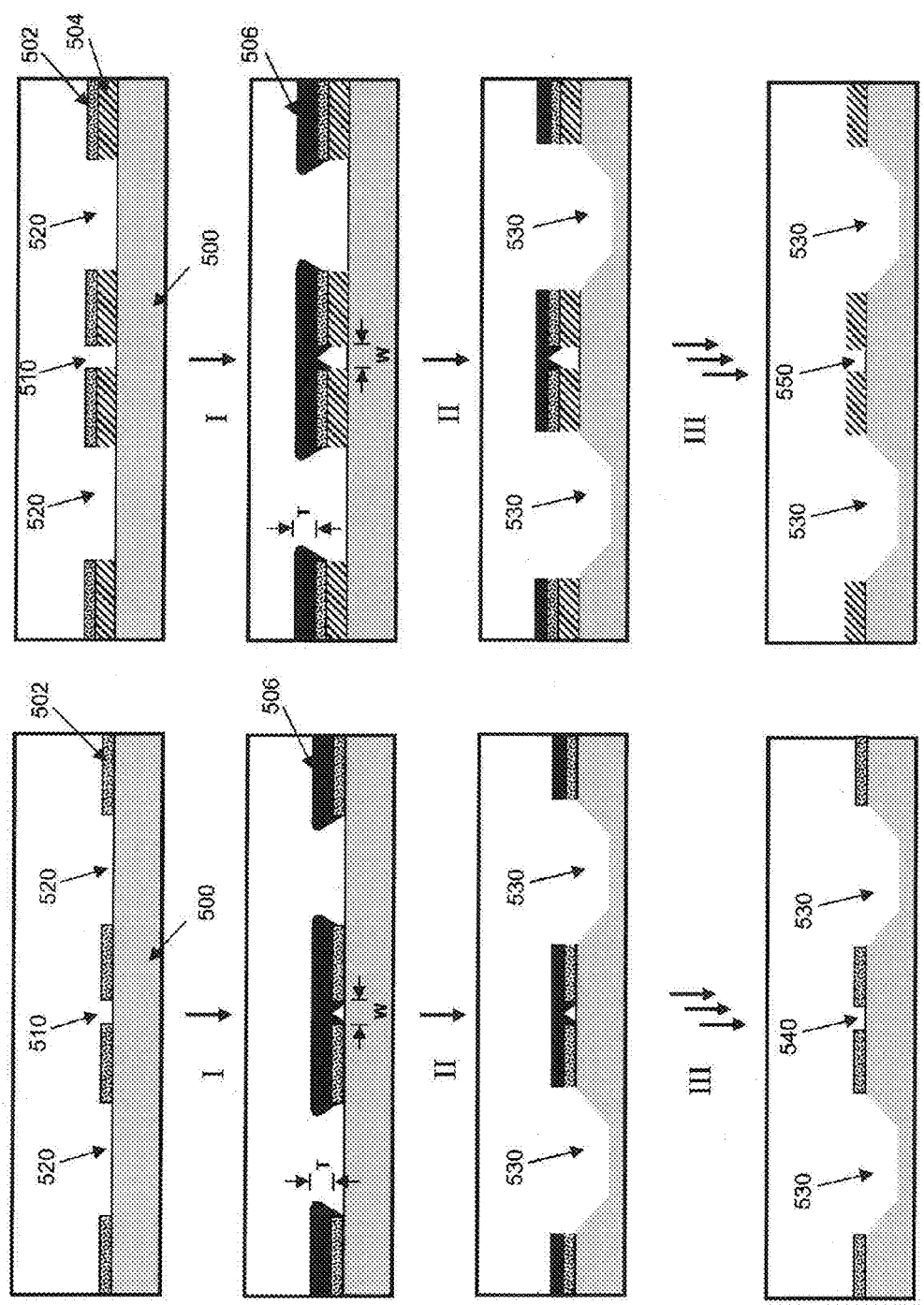
FIG. 5A is a schematic illustration of a method of the invention for selectively etching large features on a substrate while not etching the small features on a substrate.
FIG. 5B is a schematic illustration of a method of the invention for selectively etching large features on a substrate while not etching the small features on a substrate utilizing a patterned hard mask on a cladding layer.

FIG. 5 shows processes of the invention directed to selectively etching large features in the presence of small, nanoscale features. In FIG. 5(A), a substrate is provided having a patterned first hard mask on its surface. The patterned first hard mask has small features 510 and large features 520. The features in the hard mask are defined in the same step or set of steps. The features may be defined by lithography steps, such as by depositing, exposing, and developing a photoresist using a mask having features corresponding to both the small features and large features. The small features 510 may have a lateral dimension between about 10 nm and about 500 nm or from about 20 nm to about 200 nm. The large features 520 will, in some cases, have features that are significantly larger than those of the small features. The large features have a smallest lateral dimension that is generally at least 1.5, at least 2, at least 3, at least 5, at least 10, at least 20, at least 50, or at least 100 times the smallest lateral dimension of the nanoscale region.

In step (I) a second hard mask 506 is selectively deposited onto the first hard mask 502. The second hard mask 506 is selectively deposited such that it deposits onto the first hard mask, but does not substantially deposit on the substrate or the cladding layers. Such a selective deposition can be obtained, for example using chemical vapor deposition (CVD), electroplating, or electroless plating. The second hard mask is deposited in a manner such that the second hard mask extends laterally as well as vertically from the first hard mask. The second hard mask is deposited at a thickness T which is selected such that the second hard mask bridges across the small features in order to mask and protect them during subsequent etching steps. In some embodiments, the small features have a dimension W, and the second hard mask is deposited at a thickness of at least 0.5 W. The second hard mask is deposited such that:

$$T \geq W/2$$

The second hard mask does not extend across the large features on the substrate leaving they susceptible to etching.

In step (II) the substrate is etched within the large features to form depressions in the substrate 530. The etching can be performed to either have vertical walls or profiled walls, depending on the application. The angle and shape of the profiled walls can be selected for improved performance for the desired use. Etching can be performed by wet etching or dry etching processes. The etching method will generally be performed such that there is a high selectivity between the etching rate of the substrate and that of the second hard mask.

In subsequent steps III, the second hard mask is removed to produce a substrate having regions comprising a first hard mask layer with nanoscale features 540 within them, and having depressions 530 in the substrate between the regions comprising the first hard mask. It is understood that this process can be incorporated with other processes, and thus will generally comprise other steps before, after, and between the steps shown. This aspect of the invention allows for selectively etching large features while not concurrently etching small features.

The first hard mask can be polycrystalline germanium deposited by low pressure chemical vapor deposition (LPCVD), plasma enhanced chemical vapor deposition (PECVD), or evaporation. The first hard mask can also be titanium or titanium nitride deposited by sputtering. The first hard-mask can be wet-etched in hydrogen peroxide ($H_2O_2$) at 90° C., which is selective to aluminum, silicon-germanium and oxide, or dry-etched in $SF_6$ or $XeF_2$, which is selective to aluminum and oxide. The second hard mask can be polycrystalline silicon-germanium deposited by low pressure chemical vapor deposition (LPCVD), rapid thermal chemical vapor deposition (RTCVD) or epitaxial growth to be selectively deposited on amorphous silicon or germanium. For reference to CVD. See Ozturk et al, "Selective deposition of doped silicon-germanium alloy on semiconductor substrate, and resulting structures" U.S. Pat. No. 5,336,903, incorporated by reference in its entirety for all purposes. For reference to epitaxy see Glass et al, "Selective deposition of smooth silicon, germanium, and silicon-germanium alloy epitaxial films" U.S. Pat. No. 5,336,903, incorporated by reference in its entirety for all purposes.

The second hard mask can also be amorphous silicon deposited by plasma enhanced chemical vapor deposition (PECVD). A first layer is deposited using silicon precursor, followed by hydrogen precursor to remove the portion with low bonding to the substrate and keep the portion with high bonding, in which case germanium or metals such as chromium will comprise the first hard mask: as reference to partially selective amorphous silicon. See e.g. Jason et al, "Selective deposition of amorphous silicon films on metal gates" US patent application 2010/038687 published Feb. 18, 2010, incorporated by reference in its entirety for all purposes.

For the methods of the invention, where suitable, there can be layers between the layers described. FIG. 5(B) shows a process that is very similar to the process depicted in FIG. 5(A), but where there is a cladding layer 504 between the substrate 500 and the first hard mask 502. The process is carried out as described for FIG. 5(A). For the steps (III), both the first hard mask 502 and the second hard mask 506 are removed. The process produces a substrate having regions comprising a cladding layer with nanoscale features 550 within them, and having depressions 530 in the substrate between the regions comprising the cladding layer.

The methods of FIG. 5 can be used to produce structured substrates for use as micromirrors, or for other uses. For micromirror applications, the substrate is transparent, but for other uses, the substrate need not be transparent, and can be any suitable inorganic or organic surface. The substrate can comprise a semiconductor such as silicon, germanium or mixed element semiconductors. The substrate can comprise metals, metal oxides, nitrides or other suitable materials. The methods of FIG. 5(A) or 5(B) can be used to produce interdigitated electrodes, for example, for use as a capacitor or an inductor. The hard mask in the process of 5(A), or the cladding in the process of FIG. 5(B) can comprise a metal, and the nanoscale features 540 or 550 comprise gaps between electrode fingers. These small gaps can be used as the sense gaps in a capacitor sensor. The depressions in the substrate 530 can enhance the isolation between the pairs of electrodes, allowing for a more dense packing of electrode features on the surface of a substrate than on a substrate not having depressions between the electrodes. These methods can be used to produce, for example capacitor sensor arrays. The use of interdigitated electrodes to create high density capacitors is described, for example in Monajemi et al., IEEE Sensors Journal, 6(1), 39-46, 2006, and Monajemi et al., IEEE MTT-S International Microwave Symposium digest v. 2, 749-752, 2005.

The methods of the invention can be combined with other semiconductor processing methods known in the art, for example to add micro-circuitry to the substrate to use in combination with the features produced as described herein.

Multiplex Approaches

The present invention provides methods, systems and components for monitoring increased numbers of arrayed complexes on substrates. By way of example, U.S. patent application Ser. No. 12/151,979, filed May 9, 2008, and PCT/US2008/05953 (previously incorporated herein) describes methods of analyzing large numbers of arrayed reaction regions, e.g., nucleic acid sequencing complexes, using multiplex optics that direct targeted illumination spots to and collect optical signals from discrete reaction regions. As noted, these systems optionally also include confocal masks, for the enhancement of the signal to noise ratio from such detection The systems of the invention serve to further enhance multiplex of the overall systems through a variety of avenues.

Thus, while the systems of the invention may be used to provide a multiplex analysis of 10, 100, 1000, 5000 or the like discrete reaction regions on a substrate, in particularly preferred aspects, the invention will be employed to provide multiplex analysis of greater than 5000 discrete reaction regions, greater than 10,000 discrete reaction regions, greater than 20,000 discrete reaction regions, greater than 50,000 discrete reaction regions, and even greater than 100,000 discrete reaction regions, and up to 1,000,000 or more discrete reaction regions. In addition to the shear number of reaction regions analyzable by the systems of the invention, it will be appreciated that in some cases, such reaction regions can be disposed at higher densities than previously employed, through the various advantages provided by the invention. For example, discrete reaction regions can be provided and observed at high densities without excessive interference or other problematic issues. Such densities can be, e.g., 1000, 10,000, 100,000, 1,000,000, 10,000,000, or more reaction regions per $cm^2$. Density of observation volumes can be increased up to the diffraction limit of the observation light used, which can be as low as 250 nm for some of the wavelengths contemplated in these applications. At this spacing up to 16e9 observations volumes per square centimeter could be visualized in a square array, slightly more for a hexagonal close-packed array. The diffraction limit could be exceeded through the use of near-field optics, leading to a limitation governed only by the physical size of the confinements, which can be as small as 50 nm in size. Separated by 100 nm in a square array, this leads to a density of 1e10 per square centimeter.

Further, such multiplex analysis will be substantially simultaneous with respect to the number of regions being monitored.

In some cases, slower frame rates may be employed, which would increase the time period in which two events may occur while still appearing to be substantially simultaneous from the perspective of the camera. For example frame rates of 10 Hz to 100 Hz, 10 Hz to 50 Hz, 10 Hz to 20 Hz, e.g., approximately 15 Hz, may be employed. As will be appreciated, sampling rates that occur on the millisecond range may be viewed as being substantially simultaneous, e.g., from 1 ms to about 500 ms, 10 ms to about 100 ms, or the like.

Micromirror Arrays

The ability to substantially increase the multiplex in analysis of discrete reaction regions on substrates faces a number of constraints. By way of example, in systems that monitor fluorescent signals from single molecule reactions, collection optics typically employ high numerical aperture objective lenses that have a relatively small field of view. As such, increased multiplex typically requires closer packing of reaction regions in order to collect signals from larger numbers of those regions using a single objective. However, closer packing of reaction regions on a substrate gives rise to a series of additional resolution issues, including, e.g., cross talk among regions, etc.

Figure 6:
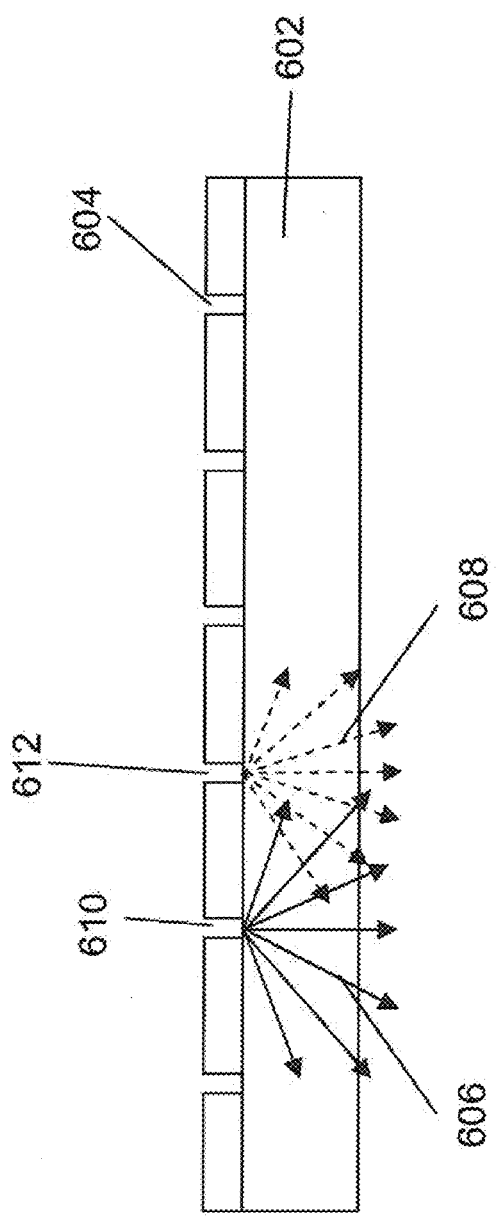
FIG. 6 schematically illustrates potential "cross-talk" issues associated with high multiplex systems.

Optical cross talk is illustrated in FIG. 6. As shown, an array of reaction regions (e.g. 604, 610, and 612) on a substrate 602, such as zero-mode waveguides 604, is provided upon a substrate. A fluorescently monitored reaction occurring in those regions is illuminated and emits a fluorescent signal associated with the reaction. As shown by the solid arrows 606 and dashed arrows 608 from adjacent reaction regions 610 and 612, respectively, the omni-directional emission profile of the signal yields the possibility of signals from adjacent regions interfering with each other, particularly as these regions become more closely packed on the substrate. This "cross-talk" can limit the ability to closely pack reaction regions for analysis.

In accordance with certain aspects of the invention, enhanced optical approaches, such as the use of micromirror arrays on a substrate are employed to enhance the efficiency of signal collection.

The micromirror/optical confinement arrays of the invention can be combined with other approaches to minimize crosstalk. One such optical approach provides for the addition of focusing optics that serve to minimize optical cross-talk among reaction regions, and also allow for the use, in many applications, of objective lenses that have a larger field of view. By decreasing cross-talk potential one improves the ability to close pack reaction regions. Simultaneously, by moving to a higher field of view objective, one can expand the area in which such regions are disposed. In addition to lowering cross-talk, the focusing optics of the invention can also increase the amount of light that is detected by redirecting light into a detector that would otherwise not be detected by the detector without redirection. By redirecting the light, a detection system can be used which, for example collects the same amount of light as without redirection, but has a lower numerical aperture, allowing, for example, a larger field of view. In the context of methods contemplated in this invention, having a large field of view can be important, for example, for allowing the simultaneous observation of tens of thousands of luminescing or fluorescing regions at once. Alternatively, by directing the light, the same numerical aperture can be used, while collecting more light. As described in more detail below, the focusing optics of the invention can also provide for increased levels of illumination by directing illumination light into a reaction region on an array, such as an array of zero-mode waveguides.

In one aspect, the invention provides a micromirror array comprising: a transparent substrate having a top surface and a bottom surface, the top surface having an array of protrusions; a cladding layer on top of each of the protrusions, the cladding layer on each protrusion having a nanoscale aperture extending through the cladding layer to the transparent substrate; a reflective layer disposed on the top surface of the substrate, so as not to cover the nanoscale apertures, whereby when light is directed from below the transparent substrate, the protrusions act as micromirrors, directing light to the nanoscale apertures; wherein lateral dimensions of both the protrusions and the nanoscale apertures are defined in a single patterning step.

The transparent substrate can comprise, for example, a silica based material such as fused silica. The nanoscale apertures can be, for example reaction volumes, or optical confinements. The nanoscale apertures can comprise zero mode waveguides.

The micromirror/nanostructure arrays of the invention have a more accurate alignment between the nanostructure and the corresponding micromirror than a micromirror/nanostructure array in which the micromirrors and nanostructures are defined in separate steps. The accuracy of alignment can be determined by methods known in the art. For example, where the nanostructure is an aperture which is supposed to be at the center of a micromirror structure, one can measure the deviation of the center of the aperture from the position it is supposed to occupy. This measurement is generally carried out over a number of micromirror/nanostructure elements, for example over 10, 100, or 1,000 elements. In some embodiments the alignment between the nanoscale aperture and the corresponding micromirror for arrays produced by the present methods is better than for a micromirror array for which lateral dimensions of both the protrusions and the nanoscale apertures are not defined in a single patterning step. In some cases, the alignment is greater than 5%, 10%, 20%, 30%, or 50% better when measured over 100 micromirror/nanostructure elements.

In one aspect the invention provides an array of shaped micromirrors wherein each micromirror is associated with an optical confinement, and in particular an array of shaped micromirrors that is incorporated into the same substrate that comprises the optical confinements. Features of the micromirror and of the optical confinement are formed in the same step or series of steps to ensure that the optical confinement is accurately aligned with the micromirror structure.

Figure 7A:
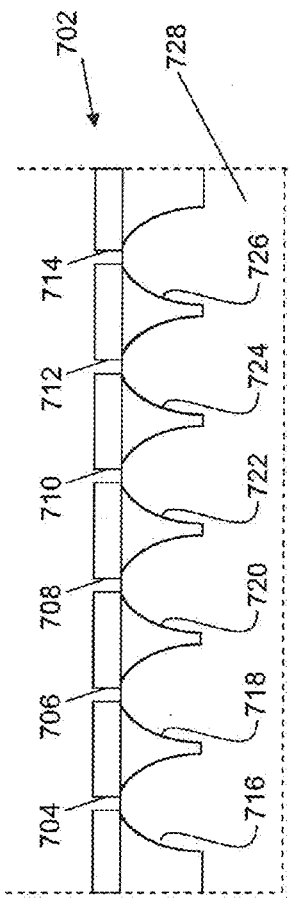
FIGS. 7A, 7B and 7C schematically illustrates a substrate employing shaped mirrors as focusing optics for efficient light collection from reaction regions on the substrate and for efficient illumination of the reaction regions.

An example of an array of shaped micromirrors in accordance with the invention is illustrated in FIG. 7A. As shown, the overall substrate 702 includes an array of reaction regions, such as zero-mode waveguides 704-714, disposed upon its surface. Conical or parabolic mirrors 716-726 are integrated into the underlying transparent substrate 728, and are configured to redirect or to focus both the incoming and outgoing light to and from the ZMWs in the array. In particular, the conical or parabolic mirrors are typically comprised of a reflective material, such as a metal layer, e.g., aluminum, silver, gold, chrome, or the like, manufactured into the underlying substrate to provide the mirror surfaces.

Figure 7B:
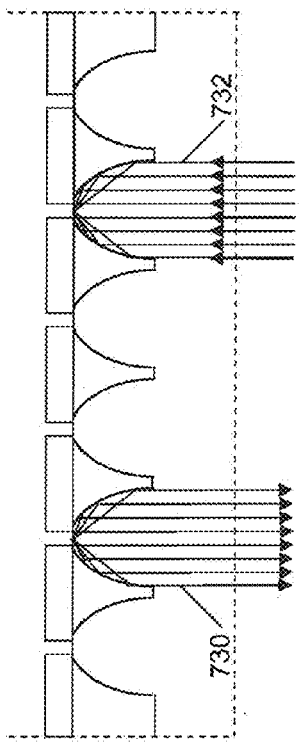

As shown in FIG. 7B, fluorescent signals 730 emitted from the reactions within the ZMWs are redirected or focused by a mirror such as a parabolic or conical mirror increasing the efficiency with which such signals are collected. As shown here, for example omni-directional emitted light coming into the reaction regions on the substrate is redirected such that it is more readily detected. In some cases, as illustrated here, the light can be at least partially collimated. In addition, for each reaction region or ZMW, the mirror structure reduces or eliminates inter-ZMW cross-talk within the substrate itself. In addition to the reduction in cross-talk, it will be appreciated that the enhanced collection efficiency resulting from redirection or focusing of the emitted light also increases the sensitivity of the system. Likewise, the shaped optic elements will also serve to focus incoming illumination, e.g., light 732, onto the reaction regions such as ZMWs 704-714. By having the optical confinement aligned accurately with the micromirror, the fluorescent signals 730 are more effectively directed to the detector, and the incoming illumination 732 is most effectively focused on the optical confinements.

Figure 7C:
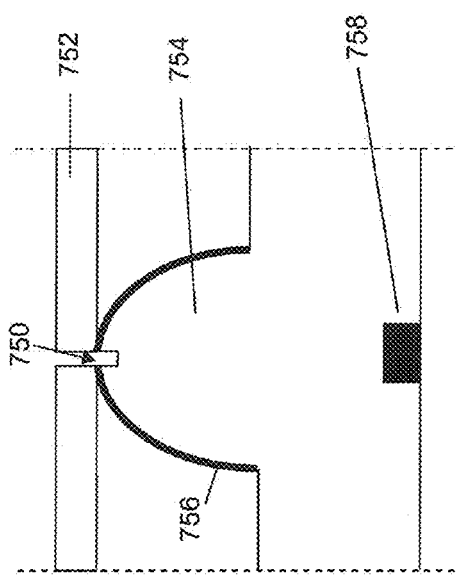

Alternative configurations may be adopted for the devices incorporating these conical mirrors. For example, a zero mode waveguide core region may be extended into the underlying substrate. This example is illustrated in FIG. 7C, in which the reaction region 750 extends beyond cladding layer 752, and into the underlying substrate 754, allowing in some cases for more efficient signal transfer to and from the reaction region 750, that is reflected off of mirror 756. Optional components such as light blocking regions or filter components may be additionally included within the overall structure, including, for example, mask 758, to further enhance the optical properties of the mirror system.

Although the mirrors described herein are referred to as "conical" or as "parabolic" mirrors, it will be understood that such integrated reflective focusing optics components will be characterized by their ability to provide a reflective component within the substrate that enhances the detection of light by redirecting the light emitted from the reaction region through the substrate, irrespective of its precise shape. In some cases, the light emitted from the reaction region is at least partially collimated. The shaped minors of the invention will thus redirect light from an optical confinement on the substrate to a detector, or to an optical element that is part of an optical train bringing light from the substrate to a detector. The focusing mirrors may comprise shapes other than parabolic structures, such as conical mirror configurations, staged conical mirror configurations, truncated conical mirror configurations, partial parabolic mirror configurations, trapezoidal mirror configurations, pyramidal mirror configurations, and the like, provided such structures redirect the light, for example to enhance the detection of light emanating from or through the reaction region into the substrate, for example by partial collimation. In many cases, the mirrors will have a cylindrical symmetry. The shape of the mirror can be a prismatoid, for example, a pyramid, wedge, prism, antiprism, cupola, or frusta thereof. Where the mirror has multiple sides, such as where it comprises a pyramid or a frusta of a pyramid, the mirror can have any suitable number of sides. For example, where the mirror comprises a pyramid, the pyramid can have 3, 4, 5, 6, 7, 8, 9, 10, 11, 12, or more sides.

The shaped minors of the invention are generally micromirrors, meaning that the minors are small, generally having dimensions on the order of microns or tens of microns. In some cases the term microreflector is also used to refer to a micromirror. The mirrors can have a cross-sectional dimension from about 0.1 micron to about 100 microns, about 1 micron to about 50 microns, or about 2 microns to about 20 microns. While the mirrors of the invention have dimensions on the order of microns to tens of microns, in some cases, the shaped minors of the invention can be larger, for example greater than about 100 microns.

Further, although described in terms of providing a reflective material such as a metal layer within the substrate itself, it will be appreciated that other reflective configurations may be likewise employed without the use of a metal layer. For example, structures may be comprised of materials of differing refractive indices to provide for a reflective interface that performs the same function as the metal layers described elsewhere herein. For example, light that is traveling from a region of one refractive index across an interface into a region of a lower refractive index will generally be completely internally reflected if the angle of incidence of the light is greater than a give value (the critical angle). In this manner, reflective structures of the invention may be created without the use of a reflective layer by appropriately adjusting the refractive indices of the materials on either side of the shape.

Figure 8:
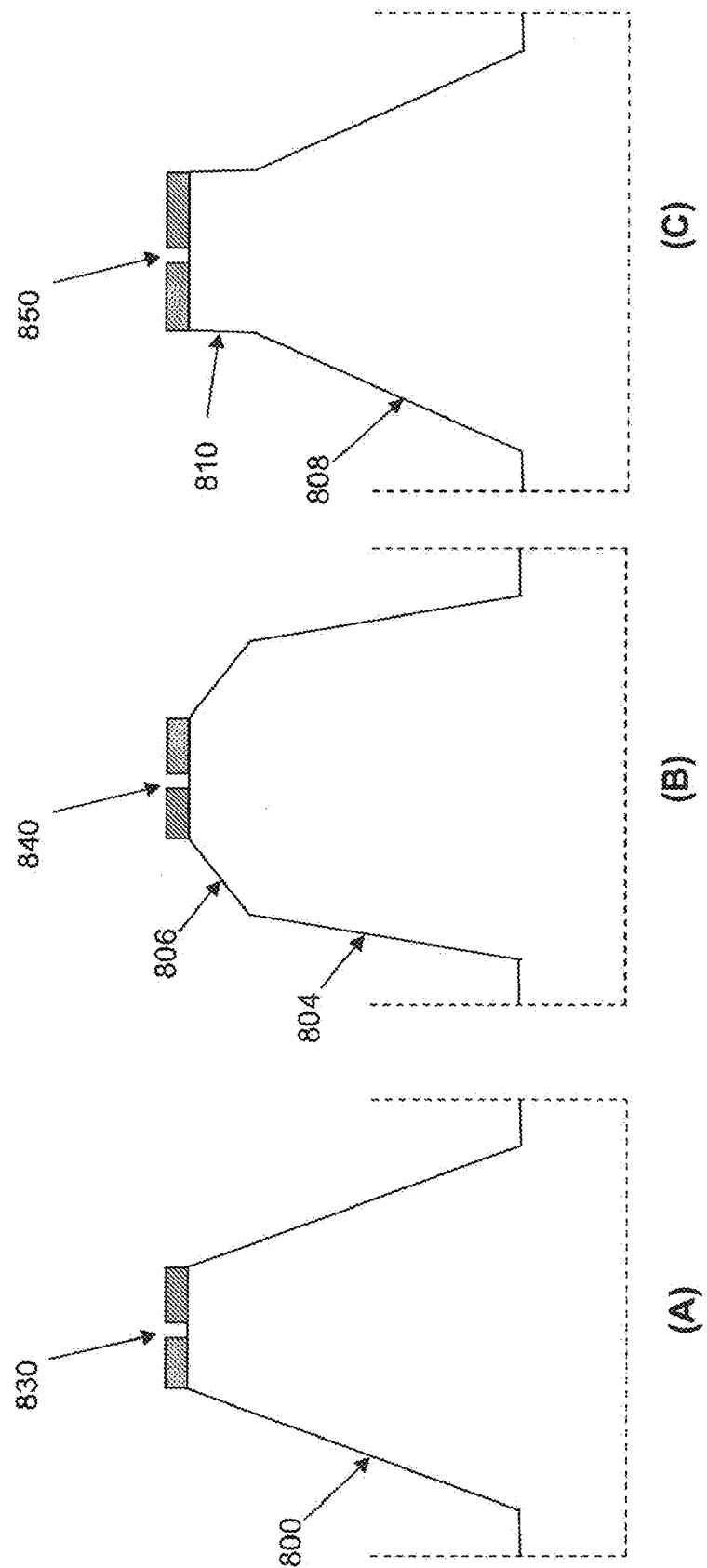
FIGS. 8A, 8B, and 8C schematically illustrate three alternate conical microreflector (micromirror) structures.

In some cases, the shaped reflective structures of the invention comprise conical reflectors. The efficiencies in a conical reflector scheme show substantial improvements over non-reflector substrates both in theoretical models and experimentally. In some cases, conical structures are useful as they can be readily formed by a variety of processes. For example, the tapering of the walls can be controlled by controlling the geometry of the resist, and by the lithography conditions. The resist geometry can be controlled, for example, by controlling the focus/exposure conditions of the resist to control the topology of the resist, or by gray-scale lithography. The shape can also be controlled by controlling the etching conditions, for example, controlling the amount of surface passivation or by gray-scale etching. The conical mirror substrates of the invention generally comprise a truncated cone structure. The walls in the truncated cone section of the conical mirror substrates can be straight, or can include some curvature. Examples of three conical structures are illustrated in FIG. 8. FIG. 8A shows a conical mirror structure where the structure of the mirror is a truncated cone comprised of a straight sided conical structure 800, which is disposed in the substrate layer below a reaction region or reaction zone, such as zero-mode waveguide 830 in order to provide redirection of light into or out of the reaction region. FIG. 8B shows a staged conical structure having a lower conical section 804, and an upper conical section 806. Upon this structure is disposed a reaction region 840. In this embodiment the lower conical section 804 has side walls having a first angle with respect to the normal to the substrate, and the an upper conical section 806 having side walls with a second angle with respect to the normal to the substrate where the second angle is greater than the first angle. In some cases, the walls of the upper section will have an angle to the normal which is lower than that for the lower section. As shown in FIG. 8C, the conical structure can have a lower truncated cone section 808, and an upper cylindrical section 810 with walls normal to the substrate. Upon this structure is disposed a reaction region 850. Structures having the profile of FIG. 8C can be useful for producing arrays having high density. For example, a structure having a cylindrical top portion and a conical lower portion will generally have smaller base dimensions than a simple truncated conical structure having the same side wall angles. In some cases, more structures can be packed into a given area if the structures have smaller base dimensions. The reflective structures shown in FIG. 8 are shown as protruding from a base transparent layer. This base transparent layer can be a planar substrate such as a fused silica wafer having protrusions disposed on its upper surface. The structures of FIG. 8 will generally have a reflective coating or a reflective region adjacent to the walls of the structures to enhance the internal reflection of light. The reflective surface of the shaped substrate can be provided, for example, by coating the protrusion with a reflective layer, by filling the region between protrusions with reflective material, or by using a lower refractive index medium outside of the protrusion to encourage internal reflection.

While the illustrations of FIG. 8 indicate that the reactive region is in the center of the top of the conical structure, in some cases, the reactive region may not be directly in the center. Manufacturing tolerances may result in the reactive region being off of the central position. In addition, in some cases, the reactive region can be manufactured to be off-center in order, for example to experience higher levels of illumination, or, for example, where the illumination or the detection optics are disposed at an angle off of the normal from the particular reaction region. Whether on center, or intentionally displaced from the center, the production of the optical confinement features in the same step as producing the micromirror features allows for greater control of relative dimensions and of consistency of optical performance.

The micromirror arrays can be fabricated at a high density as described above for ZMW arrays. The density of micromirrors associated with reactive regions can be, for example, anywhere from 1000 ZMWs per $cm^2$, to 1,000,000 ZMWs per $cm^2$, or more. At any given time, it may be desirable to analyze the reactions occurring in from 100, 1000, 3000, 5000, 10,000, 20,000, 50,000, 100,000 or 1 Million, 10 Million or more ZMWs or other reaction regions within a single analytical system or even on a single substrate using the micromirror arrays described herein.

Figure 9:
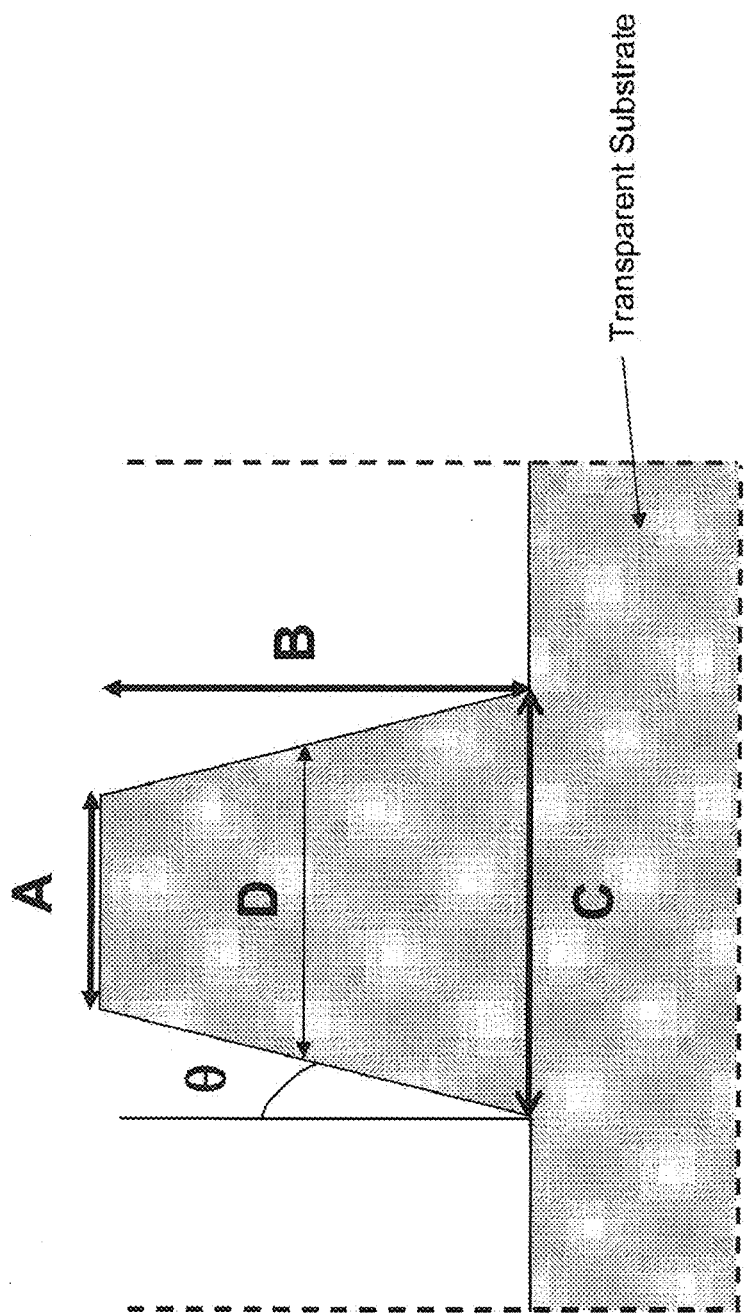
FIG. 9 schematically illustrates a truncated conical micromirror structure having specific dimensions.

FIG. 9 shows a conical structure for a micromirror of the invention. The truncated cone structure as shown in FIG. 9 constitutes a protrusion extending above a transparent substrate. The truncated cone can be a cylindrically symmetrical, having a substantially circular top surface with a diameter A, a substantially circular base having a diameter C, and a diameter at half height of D. The truncated cone has a height, B. The walls of the truncated cone are substantially straight having an angle with respect to the normal of the surface of theta ($\theta$). The side walls of the truncated cone structure shown here are substantially straight, but the walls can deviate from being straight and still function to redirect the light intensity as described herein. In some cases, the methods of producing the conical structure will result in walls that vary from being straight, for example, having curved profiles. In other cases, walls that deviate from being straight are incorporated to improve collection efficiency. In many cases, the process that produces the protrusions will result in surfaces with bumps, ridges, or other imperfections on the side walls which deviate from that of a straight profile. In some cases, having a straight profile is desirable for increasing the density of reactive regions on a substrate. For example, a curved wall, such as a parabola may have a larger base diameter than that of a straight-sided cone. By using the structure with the smaller base diameter, higher packing densities can, in some cases, be achieved.

Exemplary conical structures of the invention having the profile shown in FIG. 9 have a top diameter A of between about 0.1 micron and 100 microns, for example between 1 micron and 20 microns, or between 2 microns and 10 microns. In some cases, the diameter of the top of the truncated cone A is between about 1 micron and about 5 microns. In some cases, the diameter is between 2 microns and 4 microns. Exemplary conical structures of the invention have a side wall angle theta ($\theta$) of between about 2° and 45°, between about 5° and 35°, between about 10° and 30°, or between about 14° to about 26°. The conical structures are produced to redirect light emitted by the reactive regions, for example, at the center of the top of the conical structure. Exemplary structures will at least re-direct light emitted from the reactive region into the conical structure that has an angle of about 22.5° from the normal. In exemplary embodiments of the invention, the height of the conical structure B is between about 0.2 micron and about 100 microns, between about 1 micron and about 10 microns, or about 2 microns to about 8 microns, or about 3 microns to about 6 microns. In some cases, it is desirable to control the ratio of the height of the truncated cone to the diameter of the base (B/C). In exemplary embodiments, the ratio B:C is between about 1:3 and about 3:1, is between about 1:2 and about 2:1, between about 1.5:1 to about 1:1.5, or between about 1.2:1 to about 1:1.2. It will be understood to those in the art that the choice of A, $\theta$, and B will determine the width of the base, C. As described above, in order to increase the density of the optical structures of the invention, it can be desirable to control the parameters such that the width of the base C is small enough to allow the increased density. The diameter of the base C can be between about 0.2 micron and about 100 microns, between about 1 micron and about 10 microns, or about 2 microns to about 8 microns, or about 3 microns to about 6 microns.

An exemplary conical structure of the invention has a top diameter A of between about 1 micron to about 5 microns, a height B of between about 2 microns to about 8 microns, and a sidewall angle between about 10° to about 30°. The exemplary conical structures of the invention will have a reaction region disposed on the top portion of the cone, generally approximately at the center of the top portion. The reaction region can be for example, a zero-mode waveguide comprising an aperture disposed through a reflective cladding layer on the top surface of the conical structure. Such aperture can have a diameter of about 30 nm to about 300 nm.

Figure 10:
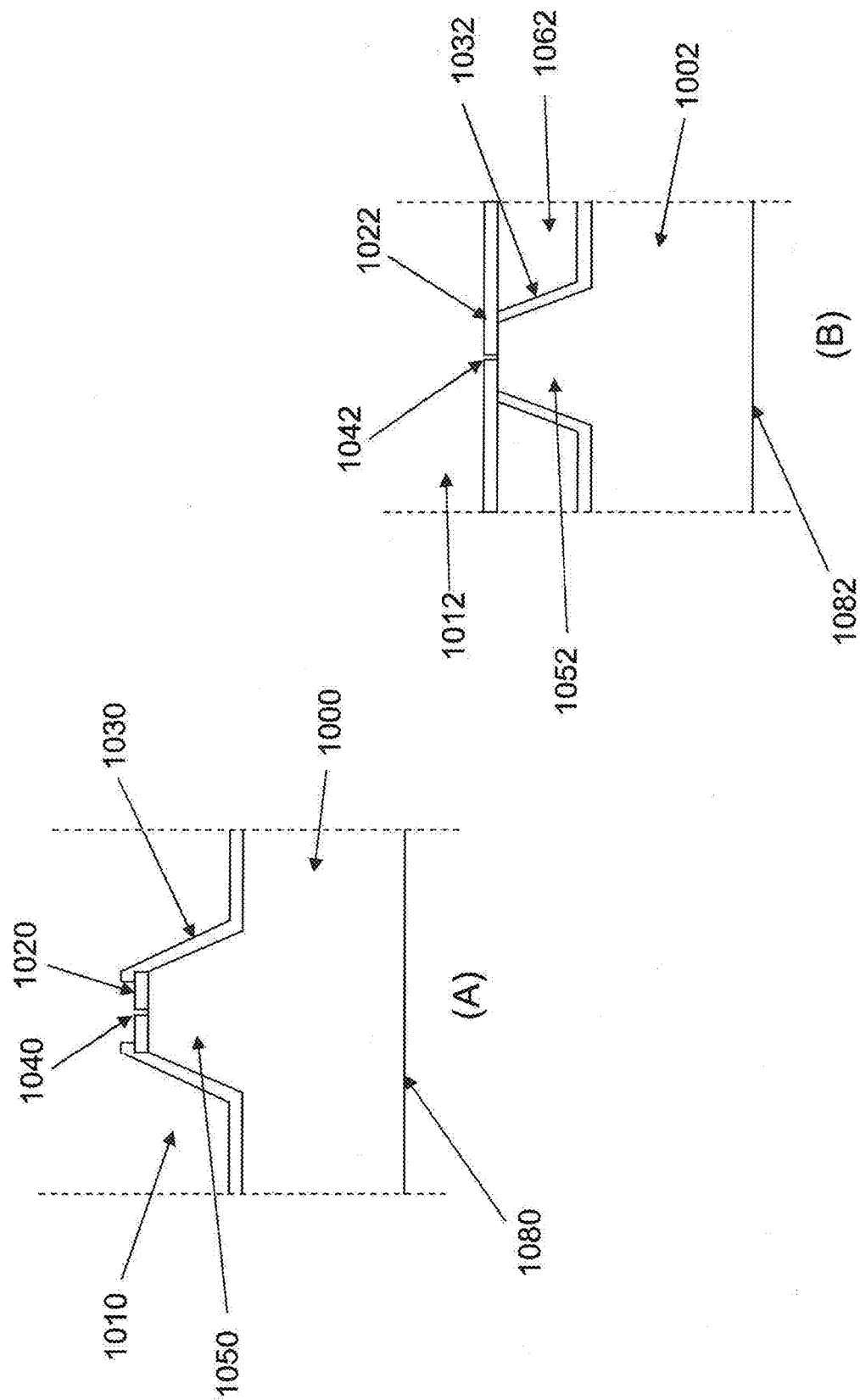
FIG. 10A-B schematically illustrates micromirror structures which can be produced, for example, using methods such as lithography and etching.

FIGS. 10(A) and 10(B) show two exemplary structures for shaped mirrors of the invention. These structures can be produced, for example, by methods developed for microfabrication including semiconductor processing and for creating MEMS devices such as those incorporating photolithography and etching. FIG. 10(A) shows a transparent substrate 1000 having a top surface onto which an array of protrusions 1050 having reflective coatings 1030 on their sidewalls is disposed. The protrusions 1050 are shaped micromirrors that will re-direct illumination light into reaction region 1040, and/or redirecting emitted light from the reaction into detection optics disposed below the bottom surface 1080 of the transparent substrate 1000. The reaction regions 1040 are, for example zero-mode waveguides comprised of nanoscale apertures extending through a cladding layer 1020 disposed on top of the micromirror structure. In some cases, the reaction regions 1040 will extend into the transparent substrate. A reflective layer 1030 is disposed on the outside walls of the micromirror to enhance the reflectivity of the walls. In some cases, the cladding 1020 and the reflective layer 1030 will be the same material, e.g. aluminum. The region 1010 above the transparent surface can contain a liquid medium comprising sample and/or reactants which can diffuse into or out of the reaction region. In some cases, all of the reaction regions in the array will be in contact with the same solution in the region 1010. In some cases, barriers are included between reaction regions which will lower or prevent diffusion between reaction regions.

FIG. 10(B) shows an alternative structure for the shaped mirrors of the invention. FIG. 10(B) illustrates the situation where, while the transparent substrate 1002 comprises protrusions 1052, the overall substrate is substantially planar due to the planarization layer 1062. A reaction region 1042 is disposed on the top of the protrusion 1052, for example as an aperture through a cladding layer 1022. A reflective layer 1032 may be disposed on the protrusion 1052 to improve reflectivity. In some cases, no reflective layer 1032 is used, for example where the planarization layer 1062 comprises a reflective material. The planarization layer can comprise a hard material, such as an inorganic material, for example a spin-on glass or silicon nitride. The planarization layer can comprise a metallic material such as aluminum. The planarization layer can be a soft material, such as a polymeric material, e.g. an organic polymer such as polyimide or a siloxane based polymer. Sample and reagents can be introduced to the reactive region 1042, for example, via a liquid medium in the region above the substrate 1012.

The transparent substrate can comprise inorganic materials, organic materials, or composite materials with both organic and inorganic materials. The transparent material is typically a rigid material which can keep the reactive regions in fixed positions during observation. Silica based materials such as fused silica are preferred materials, for example, where semiconductor or MEMS processing methods are used to produce the micromirror arrays. The transparent substrate may also comprise inorganic oxide materials and glasses. The transparent substrate material may be a heterogeneous material, such as a material having multiple layers. In some cases, for example, the transparent substrate may comprise a dielectric stack. Transparent polymeric materials can also be used. It is typically desired that the transparent material exhibit low levels of autofluorescence. Suitable transparent polymers comprise, for example, methacrylate polymers such as PMMA, polycarbonates, cyclic olefin polymers, styrenic polymers, fluorine-containing polymers, polyesters, polyetherketones, polyethersulfones, polyimides or mixtures thereof.

The reflective layer on the outside of the protrusion in the transparent layer can comprise a metallic material such as aluminum, copper, gold, silver, chrome, or mixtures thereof. The reflective layer can also comprise a reflective organic polymer, such as a composite material comprising reflective particles dispersed in a polymeric material.

The cladding layer is an opaque or reflective material. The cladding layer can be a metal such as aluminum, copper, gold, silver, chromium, titanium or mixtures thereof. In some embodiments, the reflective layer and the cladding layer comprise the same material.

The micromirrors of the invention can improve the efficiency of collection of the light from reactive regions on the substrate over the collection efficiencies which would be obtained without the mirror structures. The collection efficiency of an optical system is typically influenced by the numeric aperture of the collection system. The micromirrors of the invention can improve the amount of light collected by a detection system having a given numeric aperture, e.g. a numeric aperture of 0.5, by greater than about 10%, 20%, 30%, 40%, 50%, 75%, 90%, 2 times, 3 times, 5 times, 10 times or more than the amount of light collected without the micromirrors. The numerical aperture of the detection system can be, for example, from 0.1 to 0.9. In some cases the numerical aperture is between about 0.2 and 0.5.

The micromirror structures can also increase the level of illumination of the reaction regions from an illumination source. For example, the level of illumination can be increased by greater than 20%, 30%, 40%, 50%, 75%, 90%, 2 times, 3 times, 5 times, 10 times or more than the level of illumination without the micromirrors.

In one aspect of the invention, the mirror structures are produced such that the illumination light undergoes constructive interference such that light intensity is increased in the reaction region. Light can undergo interference, which is the addition or superposition of two or more light waves that result in a new wave pattern. Interference can occur, for instance, for waves which are correlated or coherent with each other, for example because they come from the same source or because they have the same or nearly the same frequency. For example, for the mirror structures of the invention, incoming light can be redirected from the side walls of the structure such that the light redirected from different portions of the side walls interacts within the mirror volume to either constructively or destructively interfere. Since the redirected light derives from the same source, each redirected portion of light will tend to have substantially the same frequency. Whether the light in a give region will undergo constructive or destructive interference will depend on whether the light is in phase (constructive) or out of phase (destructive). By controlling the geometry of the micromirror structure and the properties of the illumination light, the regions of constructive or destructive interference can be controlled.

Electromagnetic modeling tools, such as finite different time domain (FDTD) or finite element methods (FEM) can be used to determine the areas of constructive interference by inputting the mirror structure and illumination light parameters. We have determined that for a cone structure where the top diameter is similar in diameter to the beam diameter, the field in a localized region, such as the reaction region can be increased on the order of 10 times the intensity without the constructive interference. In some cases, the localized area of high intensity can have dimensions of about 0.25 to about 1 wavelength in size. Having a beam diameter on the same dimensions as the micromirror can be advantageous for enhancing the illumination. In some cases, the mirror structure has a top surface, for example, is a truncated cone having a planar top surface, and the top surface has a diameter. In such cases, the ratio of the diameter of the top surface to the beam diameter of the incoming light for these systems is from about 1:5 to about 5:1, from about 1:3 to about 1:3, from about 1:2 to about 2:1 or about 1:1.5 to about 1, 5:1.

Figure 11:
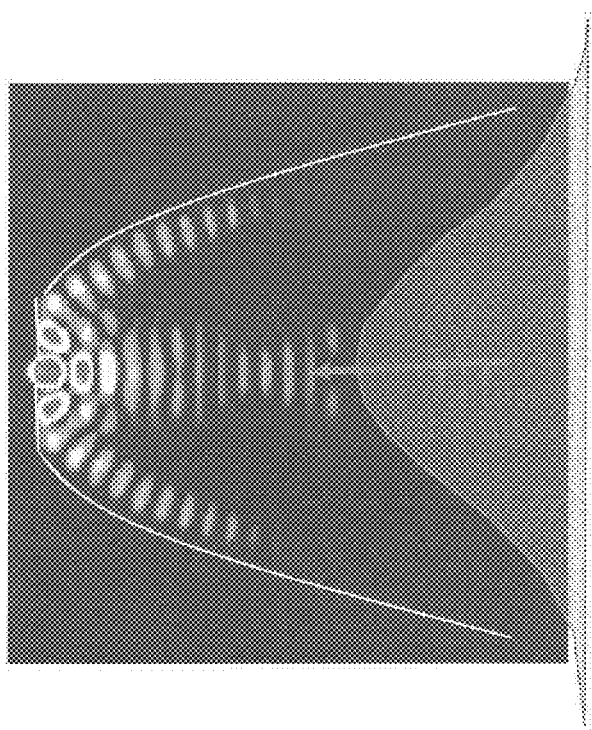
FIG. 11 schematically illustrates how the micromirror structure can enhance illumination light intensity by constructive interference.

FIG. 11 shows an illustration of a micromirror structure being illuminated with collimated light. The different shades in the figure within the micromirror structure represent different light intensities. The figure shows several regions of high intensity near the top of the micromirror, with one region of high intensity occurring at the reaction region located in the center of the top of the mirror structure. By constructing the micromirror structure such that constructive interference occurs at the reaction region, the intensity of light in the reaction region can be increased over what it would have been in the absence of the micromirror. Constructive interference can be used to increase the intensity of light at the reaction regions greater than about 30%, 40%, 50%, 75%, 2 times, 3 times, 5 times, 10 times, 15 times, 20 times, 30 times or more than 30 times the intensity than the intensity would be for the same illumination light without the micromirror structure.

Fabrication of Micromirror Arrays

The micromirror arrays of the invention can be produced by a variety of methods. One aspect of the production of the arrays is the production of an array of structures such as protrusions on a transparent substrate. The array of structures can be produced by molding, stamping, embossing, machining, etching, or other suitable methods.

One preferred approach to producing the micromirror arrays of the present invention involves the use of microfabrication methods such as semiconductor or MEMS processing methods, which have been highly developed for the production, for example, of integrated circuits. Similar processes have been used to create MEMS (micro electromechanical systems) for a variety of applications including inkjet printers, accelerometers, pressure transducers, and displays (such as the digital micromirror displays (DMDs)). Microfabrication methods can be applied to a large substrate such as a wafer, which can later be diced into many devices, allowing for the production of many devices at one time. An aspect of the invention is the use of these processes for producing a micromirror array in a transparent substrate, such as a glass, e.g. fused silica. The methods of the invention apply resist processes, such as photoresists to define structural elements on the transparent substrate or other layers. Etching processes are used to produce three-dimensional structures including the reactive region and the micromirror structure. Deposition processes are used to add layers onto the substrate. Other semiconductor processes such as ashing, polishing, release, and liftoff are also employed to create the micromirror structures of the invention as described in more detail below. Suitable microfabrication techniques are described, for example, in Madou, Fundamentals of Microfabrication: The Science of Miniaturization, Second Edition, CRC Press, 2002; Campbell, Fabrication Engineering at the Micro and Nanoscale, Oxford University Press, 2007; and Franssila, Introduction to Microfabrication, Wiley, 2004 which are incorporated by reference in their entirety for all purposes.

In the methods of the invention, the arrays that are formed have both microarray features and optical confinement features that are defined in the same step or set of steps. By defining these features together, the features can be aligned more accurately than when the features are produced in separate steps. Copending U.S. patent application Ser. No. 12/567,526 filed Sep. 25, 2009 describes the production of micromirror arrays generally by processes in which the optical confinements and micromirrors are formed in different steps. In some embodiments, the micromirrors and optical confinements have features that are defined or formed in the same lithographic steps. The features can be defined, for example in the same alignment, exposure and resist development steps. In preferred embodiments of the invention, the optical confinement and micromirror features are defined using a hard mask layer. It will be understood that not all of the dimensions of the micromirror and the nanostructure will be formed in the same step, for example, for the processes described in FIGS. 2 and 3, the tops of the micromirrors and the lateral dimensions of the nanostructures are formed in the same lithography steps, but the side walls and base of the micromirror are formed in subsequent steps.

The transparent substrate can be any suitable rigid transparent material. The transparent material can comprise, for example, an inorganic oxide material such as silica. A preferred material is fused silica.

These exemplary processes do not provide an exhaustive list of the processes which constitute the present invention. The processes each involve different sets of steps. In some cases, the sets of steps from one process can be combined with sets of steps from another process to produce the substrates of the invention. For example, the steps for production of the micromirror structure in one process may be combined with steps for production of the aperture. In addition, the descriptions provided may not call out all the steps that would be incorporated. For example, in many cases, ashing, cleaning, resist removal, rinsing, and drying steps which are not described herein will in many cases be incorporated into the processes of the invention.

While the steps in the described processes show certain layers directly on top of other layers, where suitable, the processes of the invention include the inclusion of intervening layers between the layers described, but not explicitly called out herein. For example, for many resist processes, a protective layer or an antireflective coating layer such as a BARC is included, for example, between the resist layer and the layer below the resist layer. It is to be understood that such layers can be incorporated within the described processes. Unless specifically described, the order of the steps of the processes described herein can be altered where suitable. We have found that generally when metal layers such as aluminum are present, that a BARC layer is required. We have found that the hard mask layer, for example comprising silicon, germanium, or silicon-germanium can act as an antireflective coating, eliminating the need for a BARC.

In some cases the methods provide for etching steps which etch several layers, for example through both a metal cladding layer and the transparent substrate, or through all three of a protective layer, a metal cladding layer, and the transparent substrate. While the methods generally show etching the layers simultaneously, in some cases separate lithography and etching steps are carried out for each layer. For example, where etching is done through a metal layer and the transparent substrate, in some cases, it is desired to first deposit a resist and pattern a first resist to etch the metal layer, and deposit and to pattern a second resist to etch the transparent substrate. In some cases, multiple etching steps can be performed in a manner that provides, for example, staged conical structures. For example, a first lithography and etching process can etch the metal layer and extend straight down normal to the surface into the transparent substrate to form a cylindrical structure; and a second lithography and etching process which results in sidewalls at an angle with respect to the normal to the surface will produce a lower conical structure. In this manner, by using multiple etching steps, mirror structures can be produced.

The methods of the invention can be used to produce structures having any arbitrary shape including curved walls, staged conical structures, parabolic structures and the like. The multiple etch steps can incorporate any combination of isotropic, anisotropic, or gray-scale etching steps. While the described process results in a cylindrically symmetrical structure, it will be appreciated that the multistep method can also be used to produce structures having other symmetries that are not cylindrically symmetric.

The methods of the invention in some cases use resists for defining and producing structures with lithography. These resists can be, for example, photoresists or e-beam resists. While certain processes herein are described a carried out using photoresists, it is understood that the processes can be carried out using other resists, where suitable. The photoresists can be developed using UV, deep UV, G-line, H-line, I-line or other suitable wavelength or set of wavelengths. The type of resist that is used, and therefore the type of instrumentation that is employed for processing will depend on the dimensions of the features that are created. In many processes described herein, higher resolution resists and equipment will be used for the production of the aperture which corresponds to the reaction volume, where the size of the aperture may be on the order of 10 nm to 500 nm, and a lower resolution resist and associated instrumentation is used for the creation of the micromirrors, which may have features on the dimensions of 1 micron to 20 microns. Many resists are known in the art, and many are available commercially from companies such as Rohm and Haas, and Shipley. The resists used in the processes of the invention can be negative or positive photoresists. Where a process is described herein using a negative photoresist, it is to be understood that a suitable positive photoresist may also be employed where practical, and visa versa. Where appropriate, chemical amplification can also be employed in order to increase the sensitivity of the resist. The removal of the resist, the cleaning, rinsing, aching, and drying of the substrate can be performed as appropriate and as taught in the art.

In some cases, the tools used for photolithography use photolithography exposure tool capable of creating structures having feature sizes of about of 50 nm or larger. Such systems include, for example, an ASML XT1250 exposure tool.

Etching processes are used in some aspects of the invention in order to produce the three dimensional features in the transparent substrate or in other layers, to fashion, for example, optical elements such as micromirrors or lenses, or reaction volumes such as nanoscale apertures. The etching process that is used will depend on the type of material used, the dimensions of the features, and the resist system. In some cases wet etching or wet chemical etching is employed. Electrochemical etching can also be employed. In some embodiments plasma etching or reactive ion etching (RIE) is used as an etching process. Deep reactive ion etching (DRIE) may also be employed, for example, where structures having high aspect ratio are desired. Vapor phase etching, for example with xenon difluoride or dry etching for example with sulfur hexafluoride, chlorine, tetrafluoromethane, or hydrogen bromide can also be used. Bulk micromachining or surface micromachining can be used as appropriate to create the structures of the invention. The etching used in the processes of the inventions can be gray-scale etching. The conditions of the resist formation and etching are controlled to produce side walls having the desired geometries to act as micromirrors, such as having the desired side-wall angle. The etching of the cladding layer can result in different aspect ratios for example from less than about 1:1 to about 10:1. Substrate etching is performed selective to hard mask and cladding layer, in which case the etching gas ratio, RF power, and pressure will control profile, etch rate, selectivity, and roughness. For example decreasing $CHF_3$:$CF_4$ or $CHF_3$:$O_2$ and/or increasing RF power will result in a faster etch rate, more vertical profile, and less selectivity. Higher pressure by using more argon dilution will result in less selectivity and more surface roughness. Dry (plasma) etch of silicon oxide is carried out, for example using tetrafluoromethane ($CF_4$), trifluoromethane ($CHF_3$), fluoromethane ($CH_3F$), or sulfur hexafluoride ($SF_6$) chemistries. In some cases, the etching chemistry for etching fused silica substrate includes a mixture of $CF_4$ for fast etch, $CHF_3$ for increasing the selectivity to the mask by formation of a thin fluorocarbon polymer film, and argon or nitrogen for dilution. The ratio of $CHF_3$:$CF_4$, the RF power, and the pressure are used to control the etch rate, selectivity, and profile angle. In older oxide plasma etch systems, a mixture of $CHF_3$ and $O_2$ or a mixture of $C_4F_8$ and $O_2$ is used. Wet etch of silicon oxide can be carried out by hydrofluoric acid (HF), or buffered HF (mixture of HF and ammonium fluoride $NH_4F$) solutions. Buffered HF generally provides a more controllable etch rate.

Some aspects of the invention are directed at masking the small, nanoscale features in a hard mask and/or cladding material while etching regions of the substrate having larger features. In some cases the nanoscale feature will also extend into the substrate. For example, for the methods described in FIGS. 2, 3, and 5, the nanoscale feature 210, 310, or 510 may extend into the substrate. This type of structure can be produced for example, by etching of the substrate prior to performing the steps described for the processes of FIGS. 2, 3, and 5. The process of etching the nanoscale features can be performed with or without masking of the large features. Generally the depth of etch desired for the nanoscale regions is small compared to the depth of etch in the large regions to form the micromirrors, and therefore a small amount of etching of the large regions will not compromise the formation of the micromirror structures. For example, the depth of etch into the substrate at the nanoscale feature can be between about 2 nm and about 200 nm, or between about 5 nm and about 100 nm, while the depth of the etching for the micromirror is between about 1 micron and about 10 micron. For cases where the depth of etch in the nanoscale regions is small relative to depth of the micromirror etch, the large regions need not be masked during the etching in the nanoscale regions.

Some processes of the invention involve the deposition of reflective layers, or cladding layers. The deposition of these reflective layers can be accomplished by wet processes including spinning on layers from solution, or by gas-phase processes. Suitable processes include electroplating, and physical vapor deposition, such as sputter deposition, or evaporation, atomic layer deposition, and chemical vapor deposition. Metals can be used as the reflective layer and the cladding layer. Suitable metals include gold, nickel, aluminum, chromium, titanium, platinum, and silver. The reflective and/or cladding layers can comprise aluminum, which can be deposited by sputtering, for example using a commercially available sputter tool available from CVC, Novellus, Applied Materials, or MRC. Where directional deposition is desired, evaporation can be used. For example, evaporation by thermal, electron beam, or ion beam can deposit amorphous silicon or germanium or variety of metals including highly reflective metals such as aluminum, gold, chromium generally at a lower pressures (1 to 100 µTorr) compared to plasma sputtering or CVD. However, evaporation can result in poor step coverage and highly directional depositions.

In some cases, such as the depositing of the reflective layer, a conformal coating method is used. Where a more conformal coating is desired, sputter coating can be utilized. Physical vapor deposition (PVD), also known as sputtering, can deposit a variety of materials such as metals conformally. For PVD, increasing the substrate temperature can improve the conformality of the coating. Chemical vapor deposition (CVD) is also available, for example, to deposit tungsten. Atomic Layer Deposition can be used to deposit platinum, titanium, molybdenum, or nickel. The conformal coating of the reflective layer is generally carried out such that a gap remains in the regions of the surface where the hard mask or first hard mask has been undercut. The sputter coating conditions are controlled in order to provide a conformal coating having these gaps. In particular, the thickness of the conformal coating must be controlled. Where the conformal coating is too thick, there can be bridging of the reflective layer across the gaps, which can interfere with the effective lift-off of the reflective layer from the small feature regions of the substrate.

Where layers are deposited during the processes of the invention, in some cases, the layers are treated before moving on to the next step in the process. For example, the deposited layer may be annealed, planarized, cleaned, passivated, or lightly etched in order to improve its properties and the adhesion of next layer.

In some cases, layers are deposited by electrodeposition or electroless deposition. Electroplating is a plating process that uses electrical current to reduce cations of a desired material from a solution and coat a conductive object with a thin layer of the material, such as a metal. Electroplating is also referred to as electrodeposition and electrochemical deposition (ECD). The array is generally the cathode of the circuit. The array is immersed an electrolyte containing one or more dissolved metal salts as and generally other ions that permit the flow of electricity. At the array, the dissolved metal ions in the electrolyte solution are reduced at the interface between the solution and the array, such that they plate-out onto the cathode. In cases where electroplating is used, it is generally desired that the regions to be plated are connected such that they can be electrically connected to the current source for plating. For example, in the situation where the heat-sink layer is electrodeposited onto the reflective layer, the reflective layer can be connected across the array, in the etched regions around the protrusions that comprise the micromirrors allowing for electrical connection to the reflective layer in one place on the chip for electrodeposition over the whole array. Electroless deposition involves exposure to of the array to a solution having metal ions, and having a reducing agent for the reduction of the metal ions to metal on the surface of the array. The portions of the array to be coated are generally coated with a catalyst which catalyzes the reduction of the metal salts in those regions. The material that is plated is a conductive material, either a pure metal or an alloy. The metal or alloy can comprise, for example, Cr, Ni, Pt, Mn, Au, Ag, Mo, or Al.

The hard masks of the invention such as the first hard mask or second hard mask are also sometime referred to as protective layers or sacrificial layers. Suitable hard mask, protective, or sacrificial layers include germanium (Ge), silicon (Si), silicon germanium (SiGe), carbon (C), or silicon carbide (SiC). The type of material for the hard mask layers can be chosen for its selective reactivity, for example to wet chemical etchants. For example, in some cases, the ability to selectively etch germanium with heated hydrogen peroxide in the presence of silicon dioxide and aluminum results in its being utilized to produce the optical micromirror structures combined with nanoscale apertures. In addition, the first hard mask layer and second hard mask layers are chosen such that the second hard mask layer can be deposited selectively on the first hard mask layer, and such that the first hard mask layer can be selectively etched in the presence of the second hard mask in order to facilitate the undercut step. The first hard mask, second hard mask, or both can comprise a semiconductor material. In some cases, the first hard mask is germanium, and the second hard mask layer comprises SiGe which is deposited selectively on the first hard mask by CVD. The germanium first hard mask layer can be selectively etched in the presence of the SiGe second hard mask by exposure to hydrogen peroxide. Removing Ge in $H_2O_2$ is selective to $Si_xG_{1-x}$ for example when x is greater than about 0.6. Other combinations include Ge as the first and amorphous silicon as the second hard masks. In some cases the one or more of the first or second hard mask can comprise a metal. For example, Titanium or Titanium nitride can be used as first hard mask and SiGe or Si as the second hard mask. We have observed that etching Ti or TiN in heated $H_2O_2$ is selective to $Si_xG_{1-x}$ when x is greater than about 0.6 and T is greater than about 90° C. $H_2O_2$ is also generally selective to Si. For the processes of the invention that utilize a single hard mask, any metal can be used which can be removed selective to cladding layer and substrate. For example, when the cladding layer is aluminum and substrate is fused silica, the hard mask can be Cr or Ag or Au (to be wet etched in chrome etchant) or W (to be removed by $XeF_2$) or Ti or TiN (to be removed in heated $H_2O_2$).

In some eases, the hard mask, first hard mask or second hard mask is amorphous silicon or amorphous for polycrystalline germanium. Amorphous silicon is typically deposited by decomposing silicon precursor such as silane ($SiH_4$) or disilane ($Si_2H_6$) at 300 to 550° C. in a low pressure chemical vapor deposition (LPCVD) furnace or at 250 to 400° C. in a plasma enhanced chemical vapor deposition (PECVD) chamber to provide good quality and uniformity. Polycrystalline germanium is typically deposited by decomposing germane ($GeH_4$) at 300 to 450° C. in a low pressure chemical vapor deposition (LPCVD) furnace or a plasma enhanced chemical vapor deposition (PECVD) chamber. Typical flow for $GeH_4$ or $SiH_4$ is 50 to 200 sccm and typical pressure is 0.1 to 1 Torr. Ge can also be deposited by evaporation of germanium in a vacuum chamber at 25 to 300° C. with typical pressure of 1 to 100 µTorr or by epitaxy. One or more of the hard mask layers can also comprise amorphous carbon or amorphous silicon carbide deposited in a PECVD system. Amorphous carbon can be deposited using an acetylene ($C_2H_2$) precursor, while amorphous silicon carbide is generally deposited using silane ($SiH_4$) and methane ($CH_4$) precursors or trimethylsilane as a precursor. Amorphous Si or Ge can also be deposited by electron cyclotron resonance (ECR) plasma at 25 to 200° C. with typical pressure of 1 to 50 mTorr. Amorphous Si or Ge can also be deposited by sputtering at 25 to 400° C. with typical pressure of 1 to 20 mTorr. Si can also be deposited by evaporation of silicon in a vacuum chamber at 25 to 300° C. with typical pressure of 1 to 100 µTorr.

For the methods of the invention, Al can be used as both the cladding and the reflective layer and can be etched using $Cl_2$. In combination with Al, the hard mask, first hard mask, and/or second hard mask can be Si, etched with $XeF_2$, or $SF_6$; Ge, Ti, TiN, W, or SiGe etched with $H_2O_2$, $XeF_2$, or $SF_6$; Cr, Ag, Au, etched with Cr or Au etchant; Mo etched with Mo etchant; C etched with $O_2$, or SiC etched with $SF_6$. In some cases, the cladding and or the reflective layer can comprise Au which can be ion mill etched; in combination with a hard mask, first hard mask, and/or second hard mask comprising Si, Ge, Ti, TiN, W or Mo.

In some processes, an undercut process is employed. An undercut process generally involves etching in from the edges of a feature within a layer in order to reduce the dimensions of the feature. Undercut can be performed using a wet chemical reagent or dry etching that selectively reacts with a layer which has exposed edges. Undercut generally involves isotropic etching in both vertical and lateral directions, such that to create a recess in the underlying material. If the hard mask to be etched is Si or Ge, it is typical to use fluorine gas chemistry such as $XeF_2$ or $SF_6$, as fluorine ions are lighter than chlorine or bromine ions, generating more scattering and isotropicity. The lateral recess made by undercut should be multitudes bigger than hard mask thickness, in order to facilitate lift-off. For example for a 500 nm thick hard mask, a minimum 1 µm undercut is desired. In some cases a germanium layer is undercut using hydrogen peroxide, $XeF_2$, or $SF_6$. In some cases a silicon layer is undercut using, $XeF_2$, or $SF_6$.

In some embodiments of the invention, a lift-off process is used to remove the hard mask layer or first hard mask layer and the layers that have been deposited on top of these layers including the reflective layer. The lift-off process can be carried out by either a wet or a dry process. The lift-off process generally involves effectively etching away one or more hard mask layers from the edges while not substantially etching the portions of the substrate that will remain after lift-off such as the substrate and the cladding. Where one or more of the hard mask layer comprises silicon, germanium or SiGe, a dry process comprising $XeF_2$ or $SF_6$ can be used for lift-off. Such processes can be employed, for example where the substrate comprises fused silica and the cladding and reflective layers comprise aluminum.

In some cases, after the processes described herein, a planarization layer can be employed to fill in the regions between the micromirrors. The process for depositing the planarization layer will depend on the type of material that is used. The planarization layer can be a hard material, such as an inorganic material, for example silicon nitride; it can be a metallic material such as aluminum; or it can be a soft material, such as a polymeric material, e.g. an organic or silicon based polymer. The planarization layer can be a glass, such as a silicon dioxide material. In some cases, the planarization layer comprises a spin-on glass such as a silicate, phosphosilicate or siloxane material. Suitable spin-on glass materials are available, for example, from Honeywell Corporation. The planarization layer can comprise, for example, a glass doped with other agents to control its melting properties, such a boro-phosphoro-silicate glass (BPSG). Suitable polymeric planarization materials include, for example, polyimides.

The arrays of the invention can be incorporated into analysis systems for analyzing the multiple reactions occurring in the reaction regions of the array. The arrays described herein typically have reaction regions that are accessible to fluid from the top, and which are accessible for optical analysis from the bottom. The arrays are thus generally incorporated into a vessel into which a reaction mixture of interest is introduced. In some cases, the individual reaction regions are all in contact with one volume of fluid, which may have, for example, multiple nucleic acid template molecules which can be analyzed, and which may have the nucleotides, cofactors, and other additives for carrying out the reaction to be analyzed.

The vessel that comprises the array can be placed within an instrument which has the appropriate optical components, computer controls, and data analysis systems. The vessel comprising the array will be held within the instrument such that the reaction conditions, such as the vessel temperature and vessel atmospheric conditions can are controlled. The vessel atmospheric conditions can comprise the makeup of the gas above the sample, for example the humidity, and the level of other gaseous species such as oxygen.

Time Multiplex

In some embodiments of the invention the micromirror/optical confinement arrays can be used in conjunction with other methods for increased multiplex such as through the temporal multiplexing of the system, e.g., exposing different regions at different times, in addition to or in place of the other enhanced multiplexing schemes described herein. Such systems can include switching between different sets of regions at a relatively slow speed, which is analogous to a scanning approach, e.g., illuminating and/or detecting from different regions at different times, where the different timing is less critical for the different regions. Alternatively, and with reference to aspects of the present invention, the temporal multiplexing of analysis is carried out at a sufficient frequency that for a given analysis, the illumination and/or detection is carried out substantially simultaneously among the different regions, e.g., such that detection among the different regions appears simultaneous from the aspect of camera frame capture rates, as set forth previously.

In at least one implementation, the time multiplexed systems of the invention employ an optical switching component that can selectively and rapidly switch among two or more different light paths that will illuminate different regions on the substrate. For example, in a first aspect, the illumination path of an analytical system includes a switchable directional mirror within the optical path to switch the direction of the excitation illumination to different locations on the substrate. In more complex systems, a programmable mirror array, such as a digital light processor (DLP), which is capable of rapidly directing targeted illumination at different portions of a substrate may be employed. Other dynamic switching components, e.g., that can selectively switch off the optical path for subsets or even individual beamlets include, e.g., MEMS shutter arrays, spatial light modulators such as LCD SLMs. In particularly preferred aspects, the switching system operates at a frequency that exceeds the acquisition rate of the detector in the system, e.g., the frame capture rate of the camera. In particular, by switching at least 1× in a single frame capture event, and preferably, at least 2×, and in some cases more often, e.g., at least 3×, 4×, 5× or more, in the time it takes a camera to acquire a single frame, the switching process should be largely undetectable and unobservable for the detection system. By way of example, for a high speed camera that has a frame rate of, e.g., from 100 to 1000 Hz, the switching frequency of the detection system should be at least 100 Hz, 200 Hz, 1000 Hz, 2000 Hz or even greater. As will be appreciated, in some cases, dynamic modulation of individual beamlets may be used to adjust the relative intensity of individual beamlets or subsets of beamlets, to adjust for variations across the substrate resulting from other aberrations in the optical system, e.g., vignetting, etc.

Illumination of Multiplex Arrays

Multiplexed analysis of discrete reaction regions, and even simultaneous multiplexed analysis, has been accomplished previously using a number of different mechanisms. A number of such methods are illustrated in FIG. 12. For example, in a simple implementation, an array of discrete reaction regions is simultaneously illuminated with a wide illumination beam that covers a large number of such discrete regions, in what is termed "flood" illumination. This is illustrated in FIG. 12A, where the solid circles 1204 indicate reaction zones or other regions disposed on a substrate 1202, which are desired to be monitored, and the dashed line 1206 illustrates the boundary of the illumination region. As shown, a single illumination region is applied over a large number or potentially all of the discrete reaction regions without discrimination.

Depending upon the density of reaction regions on a given substrate, such flood illumination may comprise the use of a conventional laser beam or in some cases may employ beam expansion optics, in order to provide for the desired multiplex, by illuminating larger numbers of reaction regions with a single unified beam or spot. While effective at providing illumination over wide areas of a substrate upon which numbers of reaction regions are disposed, flood illumination can suffer from problems of inconsistent illumination intensity across the illuminated area. In particular, illumination intensity will tend to be greater at the center of a given beam, and drop off at the edges. Accordingly, different reaction regions will typically be subjected to differing illumination depending upon where in the illumination spot they fall. In addition, because the entire substrate area corresponding to the spot is illuminated, it can result in an inefficient use of applied radiation, e.g., wasted light that illuminates non-reaction regions thus requiring greater applied radiation than is necessary. Further, such flood illumination can present adverse effects of excess illumination, such as excess power consumption, reflected excitation light, autofluorescence of substrates as well as other optical components of the system, heating, and the like.

In other methods, an illumination beam is scanned across a substrate in order to illuminate multiple reaction sites or regions on the substrate, as shown in FIG. 12B. In particular, a relatively small illumination spot 1208, is iteratively moved across the surface of the substrate 1202, as shown by the arrows, to separately illuminate each of the reaction regions, e.g., regions 1204. Typically, such scanning systems employ conventional scanning systems, such as galvanometers, rotating mirrors or rotating prisms to direct the beam across the surface of a substrate over time. While such scanning systems are particularly effective for static systems, e.g., where one is seeking analysis of an endpoint of a reaction, except in the case of extremely slow reactions, they are not particularly useful in monitoring reaction progress over time. In particular, because the illumination beam only visits each location occasionally and for a relatively short period of time, it is not capable of illuminating and monitoring a reaction region in which reasonably fast reactions occur, in real time.

In other methods, a targeted illumination profile is used to preferentially illuminate multiple reaction sites simultaneously. For example, in one targeted illumination approach, an illumination beam is linearized to provide an illumination line that is capable of illuminating a number of discrete, co-linear regions on a substrate, simultaneously (See, e.g., International Patent Application Nos. US2007/003570 and US2007/003804, which are incorporated herein by reference in their entirety for all purposes), the full disclosures of which are incorporated herein by reference in their entirety for all purposes), as shown in FIG. 12C. By using multiple beams, or splitting a single beam before or after linearization, e.g., by passing the beam through a diffraction grating, one can create a number of parallel illumination lines, e.g., illumination line 1210, in order to illuminate multiple rows of collinear reaction regions on a substrate. Such targeted illumination reduces the wasted illumination by not illuminating the space on the substrate between the illumination lines, and consequently reduces many of the issues associated with such excess illumination, as discussed previously. However, space between co-linear reaction regions, e.g., within a given row, is still illuminated, with the accompanying issues of wasted illumination and increased noise that results.

In further refinements, targeted illumination profiles use arrayed illumination spots, e.g., illumination spots 1212 that each illuminate a subset or a single discrete reaction region, as shown in FIG. 12D. This further enhances the signal to noise ratio, and increases illumination efficiency over linear illumination profiles, by only illuminating the spaces where illumination is desired, e.g., at and/or around the reaction regions. A number of optical configurations may be used to create these types of targeted illumination profiles, including, e.g., the use of lens arrays that focus individual illumination beams into multiple arrayed illumination spots, orthogonally oriented diffraction gratings that first split a single beam into a row of multiple beams, then split each of these beams into an orthogonally oriented row of additional beams, diffractive optical elements that convert a single beam into any of a variety of different targeted illumination profiles, including e.g., gridded arrays of illumination spots on a substrate (See, e.g., U.S. patent application Ser. No. 12/151,979, filed May 9, 2008, and PCT/US2008/05953, each of which are hereby incorporated herein by reference in its entirety for all purposes).

Such systems optionally additionally include confocal or spatial filters within the optical train to further limit the impact of reflected or fluoresced light that is out of the focal plane of the system, e.g., that is not associated with the reaction regions.

The micromirror arrays of the present invention can be incorporated into analytical systems and illuminated as shown in FIG. 12. In many cases, it is advantageous to illuminate the micromirror arrays as show in FIG. 12D, in which each micromirror is illuminated with an individual beam. This approach can enhance the utilization of the light energy by directing the bulk of the light to the regions of interest. It can also result in an improvement of signal to noise.

Enhanced Multiplex Illumination

In some embodiments, the micromirror/optical confinement arrays of the invention can be employed in an instrument that utilizes enhanced multiplex illumination using multiple illumination sources in combination with one or multiple diffractive elements, to illuminate large numbers of discrete reaction areas. In such cases, two, three, four, five, ten or more laser beams may be directed through one or more diffractive optical elements to generate large numbers of illumination spots on a substrate.

In illuminating large numbers of discrete regions on a substrate, e.g., using a diffractive optical element to provide discrete beams, ensuring adequate power is delivered to large numbers of illuminated areas typically requires increases in the power applied to the system. For ultra high multiplex systems, individual illumination sources for doing this are not commercially viable, due to cost and availability. For example, in certain exemplary applications, single illumination source beams are divided into beamlets that provide near 5 $\mu W/\mu m^2$. Achieving the same illumination power for 80,000 discrete spots would suggest a single illumination beam of 500 mW.

In addition to laser issues, diffractive optical elements typically generate beam patterns that that have reasonable beam uniformity over relatively small fields of view. However, where one desires to expand the field of view, the non-uniformity of the illumination pattern can become excessive for certain applications. Thus, in expanding multiplex illumination, e.g., an order of magnitude or greater, one would expect substantial variation in illumination intensity across the illumination spots.

Accordingly, in one aspect, the present invention provides multiple illumination sources and/or source beams that are directed through the diffractive element or diffractive elements in order to provide ultra high multiplex illumination with readily available, lower power illumination sources, and greater uniformity across the field of illumination.

In addition to the use of multiple illumination source beams, the present invention also envisions the use of multiple diffractive elements, where each diffractive element receives a subset of originating illumination beams to yield an associated pattern. In particular, because higher multiplex patterns emanating from a single diffractive element may provide excessive variation over an entire larger field of view, one may employ multiple diffractive elements each of which provide an illumination pattern over a subset of regions of a particular substrate, such that the illumination variability is confined to that which exists in a relatively small field of view, and thus does not exceed the ranges for a desired application.

Detection

Similar to the multiplex approaches applied to the illumination side of the analytical systems described herein, and in addition to or as an alternative to such approaches, the micromirror/optical confinement arrays of the present invention can be employed in an instrument that has enhanced multiplex on the collection side of the system, e.g., the optical path for the collection and detection of signals emanating from reaction regions on a substrate. In particular, at least one limitation on the potential for ultra high multiplex systems, is the ability to detect signals emanating from larger and larger numbers of discrete regions, e.g., on a substrate. As will be appreciated, the expected practical limitation on detection of signals from different regions on a substrate at any given time, will be limited by the number of pixels or detector elements in a given detection system.

In particular, a given detector pixel will only be capable of detecting the signal incident upon it, and absent other considerations, will not distinguish between signal from one source and signal from another or combined sources. As will be understood, however, the practical limitation of one signal per pixel is, itself, not entirely practical, as detecting signals on multiple pixels provides myriad different information, such as spectral information, array location, and the like (See, e.g., Published U.S. Patent Application No. 2007-0206187, Published International Patent Application No. WO 2007/095119, and U.S. patent application Ser. No. 12/134,186, filed Jun. 5, 2008, the full disclosures of each of which is incorporated herein by reference in its entirety for all purposes). Similarly, separation of the signal components on the array helps to prevent signal cross contamination. As a result of these and other considerations, in multiplex approaches, it would be advantageous to optimize the efficient use of detector array area.

In a first example signals emanating from an array of reaction regions on a substrate may be directed to different regions on a detector array or even entirely different detector arrays, in order to optimally detect signals from high multiplex substrates. In a related example, different signal components from individual signal sources may be directed to different detectors.

Alternatively or additionally, just as with the temporal switching of illumination, signals emanating from different regions of a substrate may be temporally separated, but otherwise directed to the same, overlapping, adjacent or discrete portions of a substrate at different times. Again, by applying such switching at a frequency that exceeds and preferably substantially exceeds the slowest signal duration, such temporal separation will provide seamless detection of the desired signal events. Further, by synchronizing the signal analysis processes with the switching, one can readily assign a signal event with a given location on the substrate, even when such signals are incident upon the same location of a detector array. As will be appreciated, the same or similar components may be employed for the optical switching of signal direction as were discussed for switching of the targeted illumination pattern, above. In addition, it will be appreciated that LCD masks, e.g., as discussed previously, may likewise be employed in the collection pathway to selectively open and close the collection path to signals from discrete reaction regions or subsets of reaction regions.

By "work-sharing" the detection area of the detector among different signal sources, albeit at distinct points in time, one can multiply the number of signal sources that can be detected using a single detector or set of detectors over a process where temporal multiplexing is not used.

In a related aspect and as alluded to above, an individual substrate comprising a large number of discrete reaction regions may be divided up into multiple different sub-fields of view (sub-FOV), each of which may be directed to a different detector in order to accommodate high multiplex substrates. In order to efficiently and simultaneously monitor these sub-FOVs, it would be preferably to maintain a single optical train that accomplishes this monitoring process. Accordingly, in one aspect, the present invention provides an optical system that illuminates a number of reaction regions on a substrate, but directs signals from each of a plurality of subsets of reaction regions to different detectors.

Systems

Figure 13:
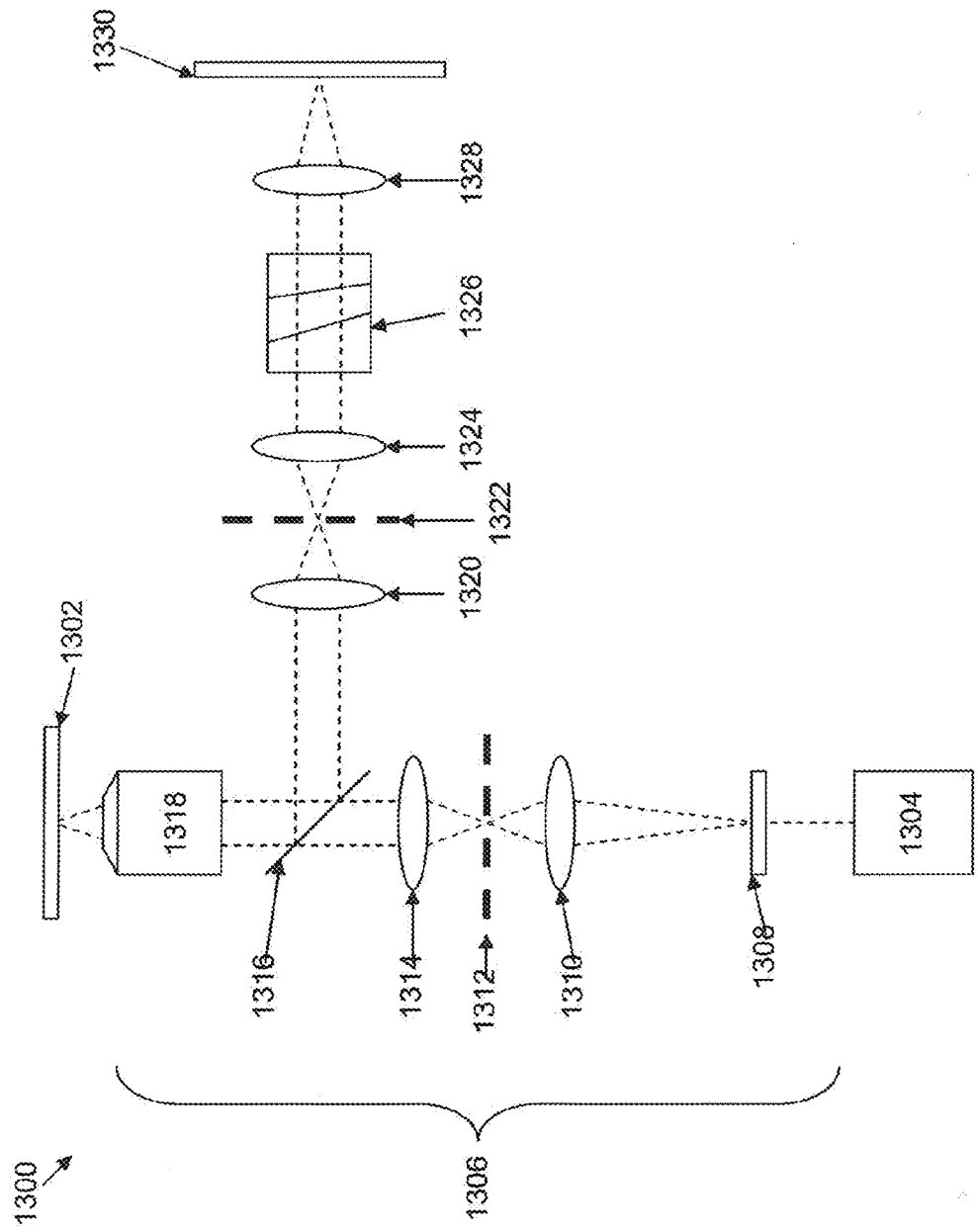
FIG. 13 schematically illustrates a system for carrying out confocal multiplex illumination and monitoring of discrete reaction regions on a substrate.

One example of a system of the invention incorporating a micromirror array having aligned features is illustrated in FIG. 13. As shown, the system 1300, includes a micromirror array, such as an array of micromirrors each having a zero-mode waveguide array 1302 on its top. In the case of such an array, large numbers of zero mode waveguides are typically provided arrayed in rows and columns on the substrate. Within the various ZMWs are provided reactants of interest for a given analysis. For example, in the context of nucleic acid sequencing by synthesis, a sequencing complex that includes a template nucleic acid sequence, a complementary primer sequence, a nucleic acid polymerase enzyme, and a reaction mixture of nucleotides or nucleotide analogs required for primer extension are provided with the ZMW (See, e.g., FIG. 1). Micromirror arrays having ZMWs associated with them can be fabricated at ultra high density, providing anywhere from 1000 ZMWs per $cm^2$, to 1,000,000 ZMWs per $cm^2$, or more. Thus, at any given time, it may be desirable to analyze the reactions occurring in from 100, 1000, 3000, 5000, 10,000, 20,000, 50,000, 100,000 or 1 Million, 10 Million or more ZMWs or other reaction regions within a single analytical system or even on a single substrate.

As shown, the system includes a source of excitation radiation for exciting fluorescent reactants in the reaction regions, such as laser 1304. An optical train 1306 delivers excitation radiation from laser 1304 to the Micromirror/ZMW array or substrate 1302. The optical train also collects fluorescent signals from the various ZMWs on the array through the corresponding micromirror, and conveys those signals to a detector, such as EMCCD 1330. The optical train 1306 includes a multiplex component, such as diffractive optical element (DOE) 1308 (also referred to as a holographic optical element or HOE), that converts a single excitation beam to large number of discrete excitation beams that will be targeted in an array of illumination spots that correspond to the location of the ZMWs on the array 1302. The multiple beams are dichroic 1316 that is selected to pass excitation light and reflect the fluorescence from the array 1302. Prior to passing through the dichroic 1316, the illumination beams may be passed through a confocal filter 1312 which may have associated with it a pair of focusing lenses, e.g., lenses 1310 and 1314, in order to focus these beams through the confocal pinhole(s). The excitation light that is passed through dichroic 1316 is then focused in a targeted pattern onto the plane of the array 1302 via objective lens 1318.

Fluorescent signals from array 1302 are then collected by the objective lens 1318, and passed to dichroic 1316, which reflects the fluorescent signals toward detector 1330. The signals from the discrete ZMWs on the array are then passed through a spatial filter, such as confocal mask 1322, to reduce background noise, such as photoluminescence, out of focal plane autofluorescence or scattered light, which again typically has associated with it a pair of focusing lenses, e.g., lenses 1320 and 1324. The signals can then be then passed through a dispersive optical element, such as wedge prism 1326 that differentially directs light of differing spectral characteristics, allowing for distinction of different fluorescent signals based upon the location upon the detector, upon which they impinge. The differentially directed signal components are then directed through additional focusing optics, e.g., focusing lens 1328, and ultimately impact the EMCCD detector 1330. As noted, the position on the detector upon which a given signal is incident is indicative of (1) the originating ZMW in the array, and (2) the spectral characteristics of the signal component, which is used, for example, to identify the type of fluorescently labeled nucleotide analog incorporated in an extension reaction.

Using the foregoing systems, simultaneous targeted illumination of thousands or tens of thousands of ZMWs in an array can be obtained. However, as the desire for multiplex increases, the density of ZMWs on an array, and the ability to provide targeted illumination of such arrays, increases in difficulty, as issues of ZMW cross-talk (signals from neighboring ZMWs contaminating each other as they exit the array), decreased signal-to-noise ratios arising from higher levels of denser illumination, and the like, tend to increase.

In some aspects, the invention provides a system comprising: a transparent substrate having a top surface and a bottom surface, the top surface having an array of protrusions; a cladding layer on top of each of the protrusions, the cladding layer on each protrusion having a nanoscale aperture extending through the cladding layer to the transparent substrate; a reflective layer disposed on the top surface of the substrate, so as not to cover the nanoscale apertures, whereby when light is directed from below the transparent substrate, the protrusions act as micromirrors, directing light to the nanoscale apertures; wherein lateral dimensions of both the protrusions and the nanoscale apertures are defined in a single patterning step; an illumination light source which directs light to the nanoscale apertures; an optical detection system which detects light emitted from one or more optical labels within the nanoscale apertures; and a computer which receives and processes information from the detection system relating to the sample, wherein either the illumination light, the emitted light, or both are directed by the micromirrors.

EXAMPLES

Example 1

Micromirror Arrays

An array of micromirrors having nanoscale apertures on their tops was fabricated starting from a fused silica (FuSi) wafer using a process as described in FIG. 3A. First, 110 nm of aluminum was deposited at room temperature onto the FuSi. Onto the Fusi was deposited a 500 nm amorphous silicon hard-mask at 350° C., 0.9 Torr, and 60 W. The first lithography was done using a 490 nm thick photoresist in an asm1-PAS5500 DUV stepper. This step defined both the small features which will become the nanoscale apertures, and the large features which will define the micromirror protrusions. The hard mask was etched in a Centura platform using HBr=100 sccm, $Cl_2$=60 sccm, RF=700 W, Bias=50 W, at 20 mTorr, followed by etching of the aluminum in the same system using $Cl_2$=90 sccm, $BCl_3$=45 sccm, RF=1000 W, Bias=100 W at 10 mTorr. The second, non-critical, lithography (step I) was done using 2 µm photoresist in the same stepper. Then the mirror was etched (step II) in Centura platform using $CF_4$=18 sccm, $CHF_3$=42 sccm, Ar=120 sccm, RF-500 W at 200 mTorr. The hard mask was undercut (Step III) using $XeF_2$=4 Torr. The reflective layer was deposited (Step IV) by sputtering 100 nm aluminum at 8 mTorr, 2.5 kW at room temperature. Finally the lift-off (step V) was done by stripping the photoresist in PRS3000 remover at 80° C., followed by final $XeF_2$ removal of any remaining hard mask and final cleaning.

Figure 14:
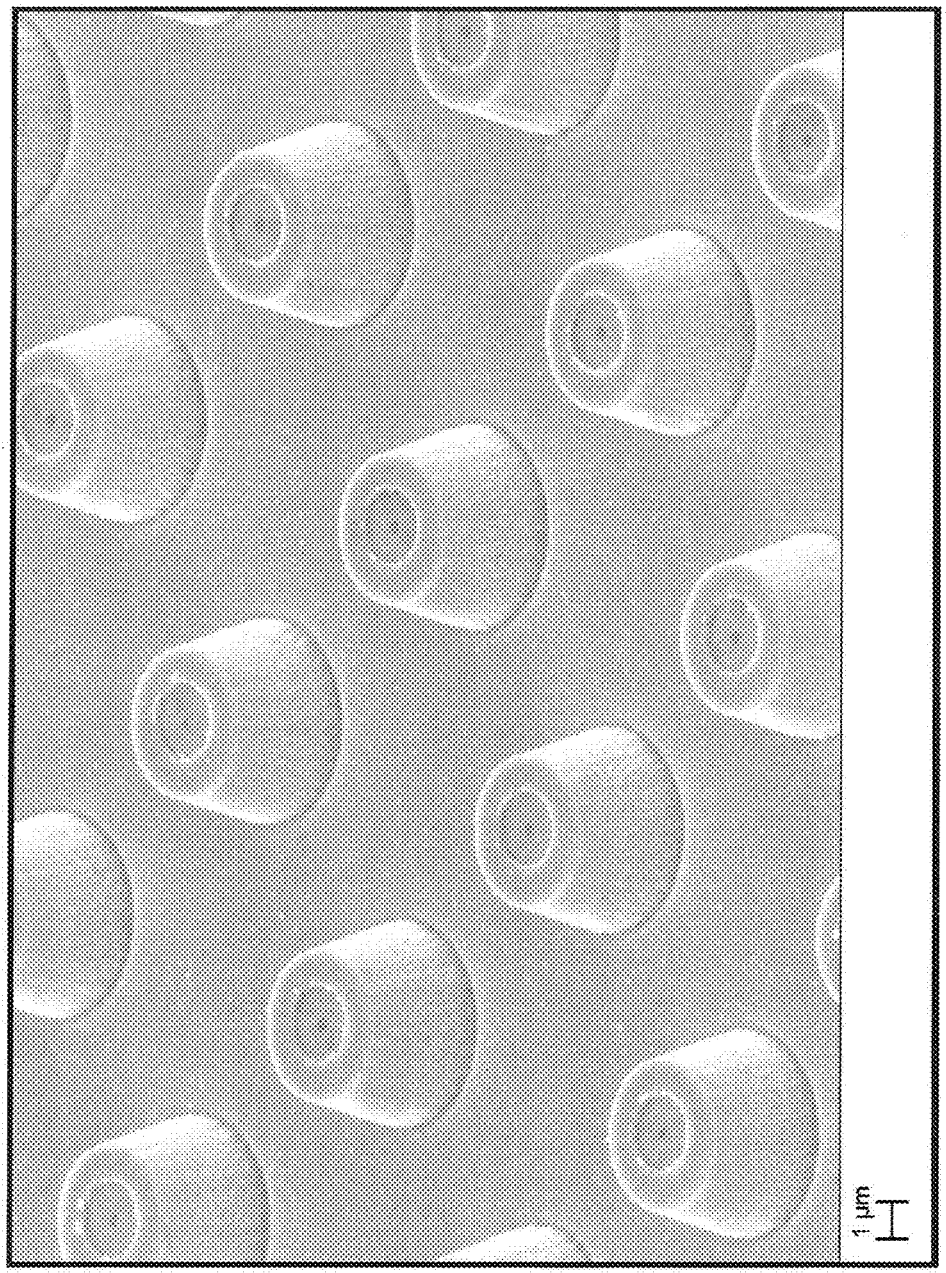
FIG. 14 is a scanning electron micrograph image of a portion of an as fabricated micromirror/nanostructure array of the invention.
Figure 15:
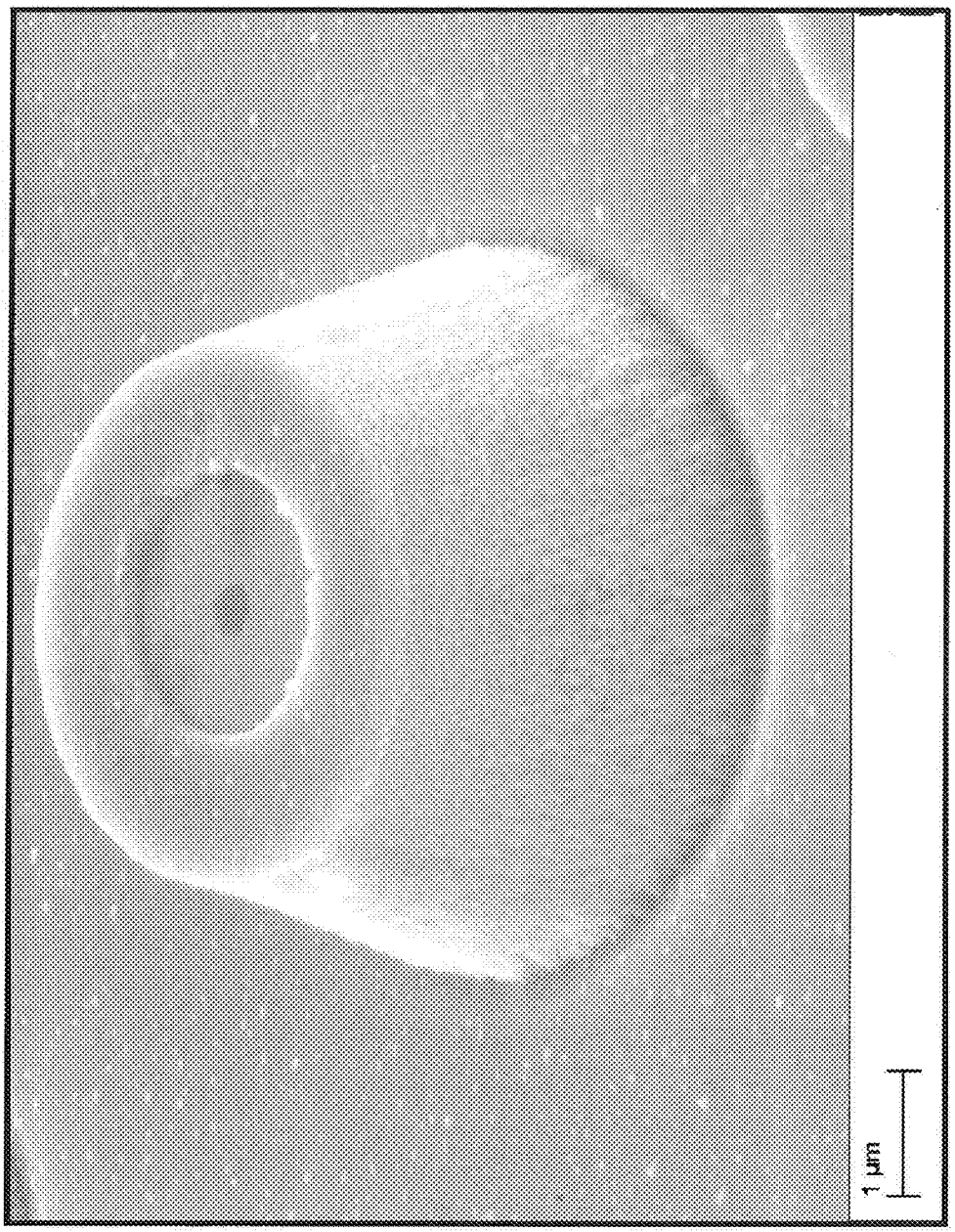
FIG. 15 is a scanning electron micrograph image of an as fabricated micromirror/nanostructure of the invention.

FIG. 14 is a scanning electron micrograph image showing a portion of the resulting array of micromirrors having nanoscale apertures on their tops. The nanoscale apertures have a diameter of about 300 nm, and that depth of the micromirror structure is about 3 microns. FIG. 15 shows a single micromirror structure from the array.

Figure 16:
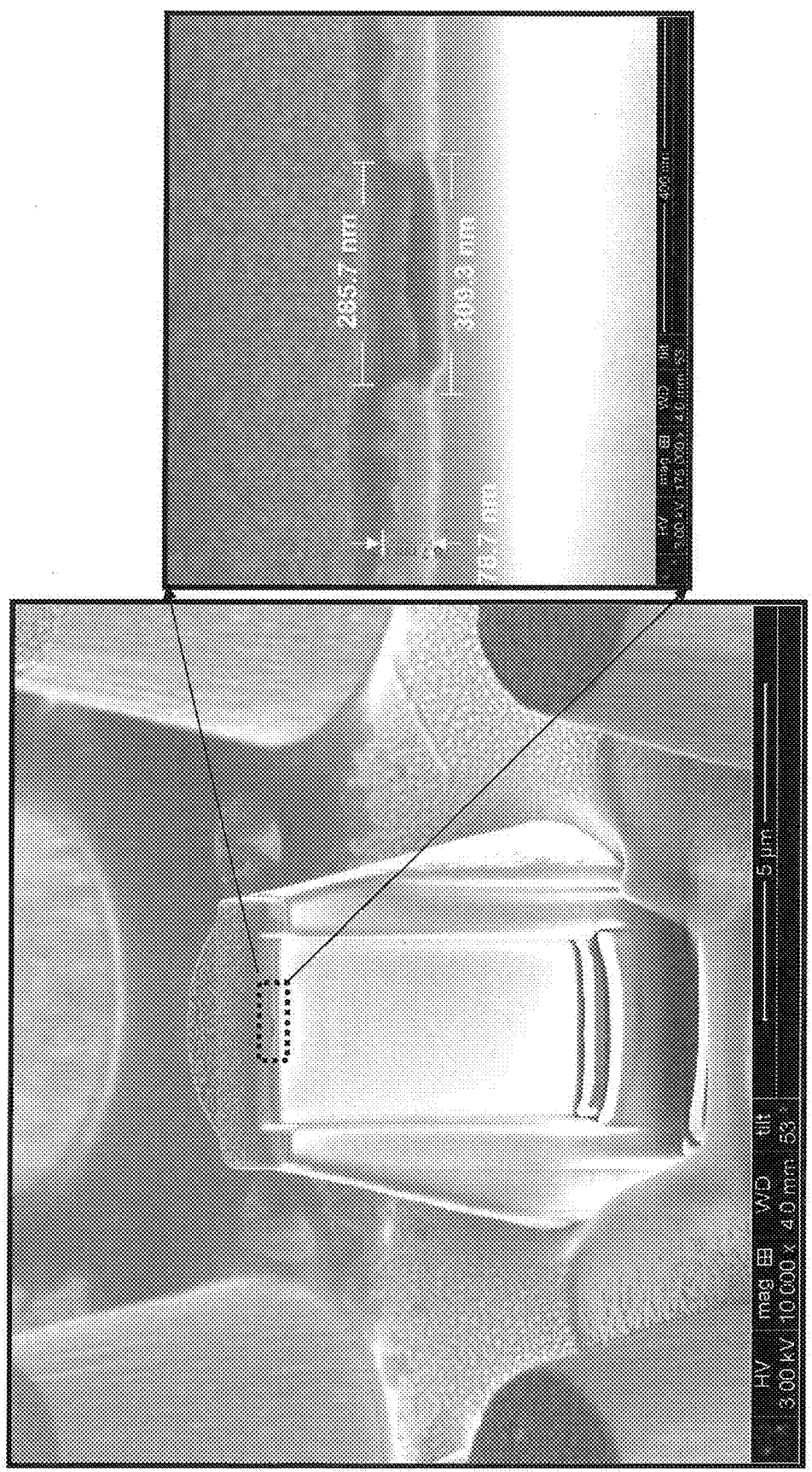
FIG. 16 is a cross-section scanning electron micrograph image of an as fabricated micromirror/nanostructure of the invention.

FIG. 16 is a scanning electron micrograph showing cross section of the resulting array of micromirrors having nanoscale apertures on their tops. Gold-Palladium has been used to protect the top while milling the structure using focused ion beam. The cross section reveals that the nanostructure has a diameter of about 285 nm on top and a thickness of 79 nm and depth of the micromirror structure is about 5.2 microns.

Figure 17:
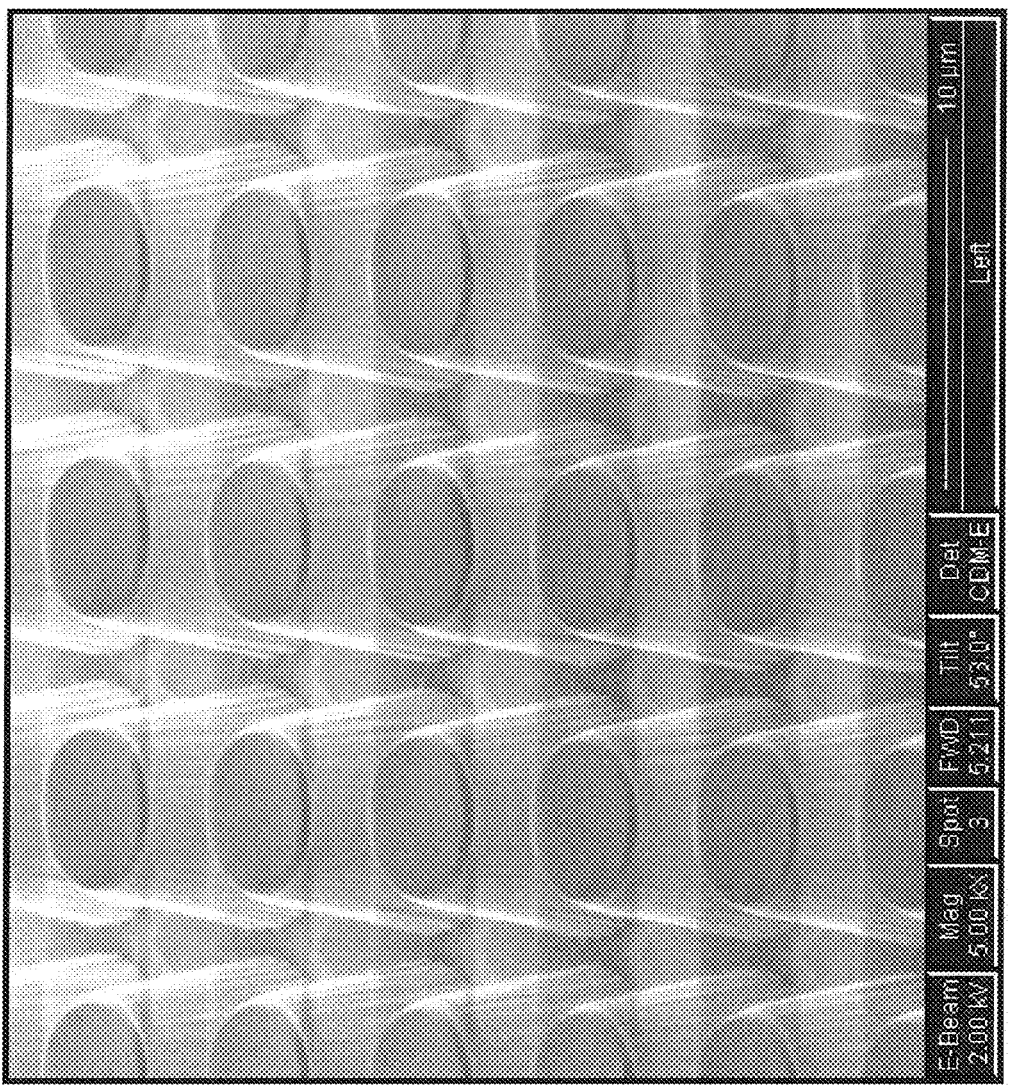
FIG. 17 is a scanning electron micrograph image of an as fabricated micromirror array of the invention using hard mask.

FIG. 17 is a scanning electron micrograph showing resulting array of micromirrors with no nanoscale apertures. The 5 micron tall mirrors have been etched using 500 nm amorphous silicon hard mask, resulting a selectivity of 10:1 which is not possible to achieve using photoresist or any other polymer. The amorphous silicon was deposited by decomposing 100 sccm silane ($SiH_4$) at 900 mTorr and 350° C. in an Oxford plasma enhanced chemical vapor deposition (PECVD) chamber with RF power of 20 W. Sidewall angle is about 77.7° and non-uniformity of mirror depth across 150 mm wafer is within +/−1.5%.

Example 2

Theoretical Modeling of Conical Mirror Substrates

Figure 19:
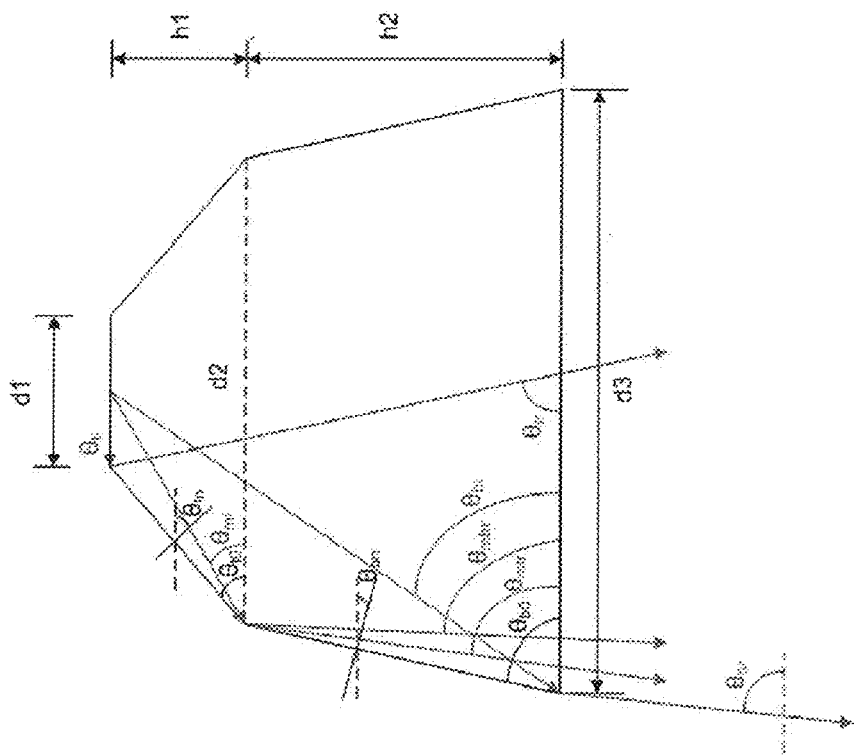
FIG. 19 illustrates the dimensional components used in modeling a staged conical microreflector.
Figure 18:
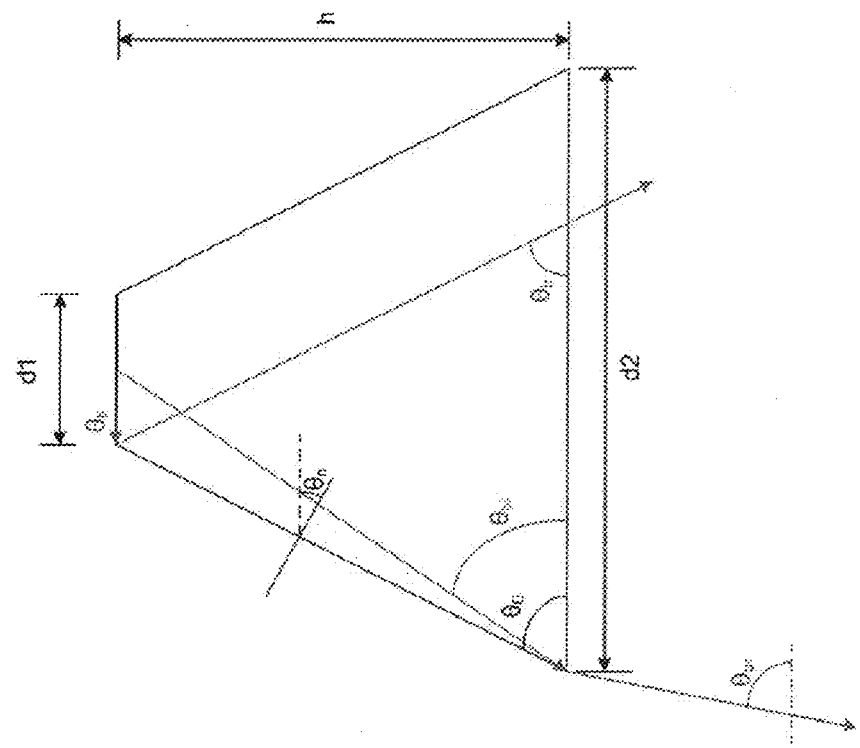
FIG. 18 illustrates the dimensional components used in modeling a conical microreflector.

Structures were modeled using the various components illustrated in FIGS. 18 and 19, respectively. For example, with respect to the straight conical structure illustrated in FIG. 18, dimensions were set as follows: d1=1.25 µm; d2=5 µm and h=4.69 µm. The model assumed that an objective lens used to collect emitted light from the substrate/reflector component has a numerical aperture of 0.5 with a highest collection angle of +/−20 degrees with respect to the optical axis, thereby providing a collection angle with respect to the bottom surface of the substrate of from 70 to 110 degrees. Based upon the conical model shown in FIG. 16, the ray angle that is reflected out of the cone is from 43.58 ($\Theta_{tr}$) to 105.52 ($\Theta_{br}$) degrees.

For the two staged conical reflector shown in FIG. 19, the dimensions were set to: d1=1.25 µm; d2=3 µm; d3=5 µm; h1=1 µm; and h2=3.69 µm. In this case, the ray angle that is reflected and comes out of the reflector ranges from 82.37 ($\Theta_{tr}$) to 116.06 ($\Theta_{br}$) degrees.

For both of the foregoing structural schemes, the photon collection efficiency for the objective is estimated to be approximately 70%, as compared to collection efficiencies of approximately 42% for a substrate that includes no reflector component, e.g., a zero mode waveguide disposed upon a transparent substrate layer, e.g., using a collection objective with a numerical aperture of 0.95. This analysis predicts improvements in optical performance from the incorporation of micromirrors, but this analysis, being essentially a ray-tracing analysis does not include diffraction or wave effects, and thus does not provide a complete picture of the expected performance. Analyses performed with vector-based tools have also been performed which confirm optical improvement from the micromirror structures of the invention.

Example 3

Gain Measurements on Conical Micromirror Structures

Figure 20:
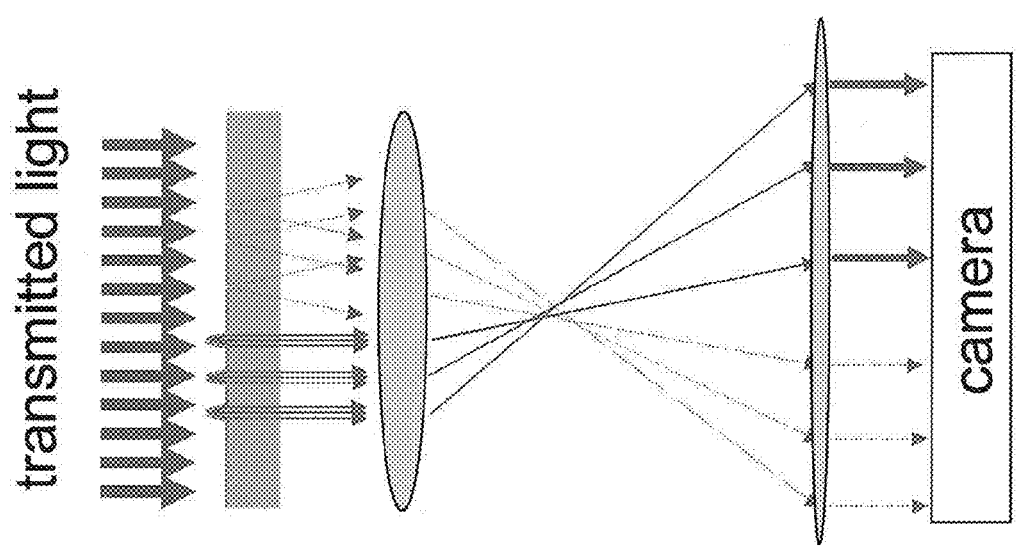
FIG. 20 shows a schematic illustration of an experimental setup for measuring the gain from micromirror structures.

Measurements were performed to determine the amount of gain that would be obtained from using micromirror structures coupled to zero mode waveguides. A substrate was prepared with FuSi having ZMW structures on the tops of micromirrors and having comparable ZMW structures on the planar portions of the substrate. FIG. 20 shows a schematic illustration of the experimental setup in which light is transmitted through the ZMW structures on the substrate. The light transmitted through the ZMW structures is collected with an optical train and detected on a CCD camera. The numerical aperture of the optical detection system was 0.5. Table 1 lists representative measurements of detected intensity from ZMW structures on the flat region of the substrate, and from ZMW structures on the tops of micromirror structures. The calculated gain from these measurements is about 5.9. It is understood that the measured gain will depend on the numeric aperture of the collection optics.

TABLE 1

Measurement of gain from micromirror structures

| flat | 2530.99 |
|---|---|
| | 2793.91 |
| | 2529.38 |
| | 2858.07 |
| | 2912.31 |
| | 3086.77 |
| mirror | 15141.68 |
| | 20340.43 |
| | 19348.46 |
| | 16883.04 |
| | 13092.21 |
| | 13952.95 |
| gain | 5.9 |

Example 4

DNA Sequencing in Reaction Regions on Micromirrors

Figure 21:
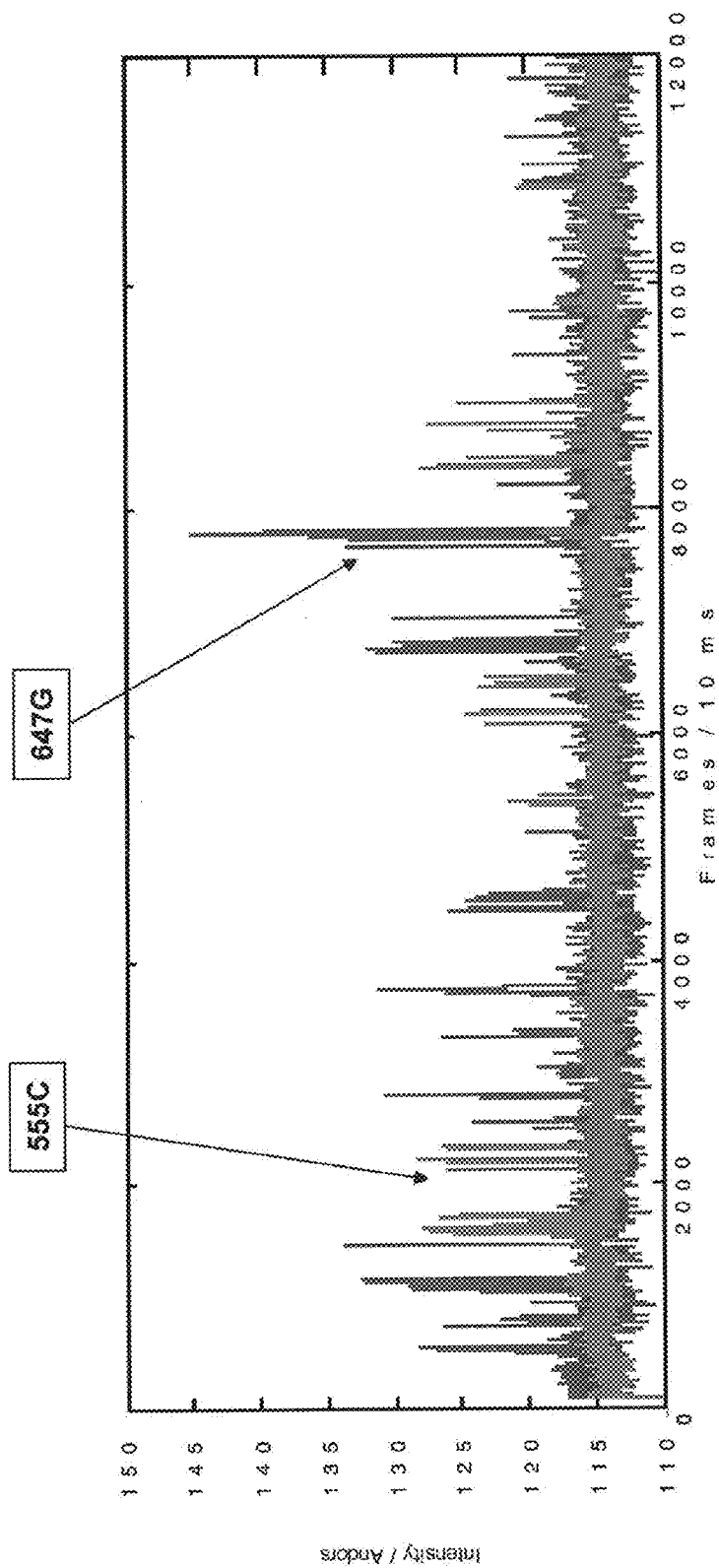
FIG. 21 shows two color DNA sequencing data obtained from zero mode waveguide reaction regions on micromirror structures.

An array of micromirror structures, each with a single zero mode waveguide aperture on its top surface was prepared from a 500 µm thick FuSi substrate. The micromirror structures were formed in the substrate using contact lithography with resist reflow and 3 micron deep reactive ion etching (RIE), followed by sputter smoothing and 400° C. annealing. A 200 nm Al layer was then sputter coated onto the surface. The Al layer was patterned and etched to produce a 120 nm diameter ZMW near the center of the top of the micromirror structures. Over etching was used such that the ZMW aperture extended about 50 nm into the FuSi substrate. A representative micromirror structure was determined to have a top diameter of about 3.4 microns and a bottom diameter of about 6.8 microns. A single molecule sequencing reaction was performed as described in Eid, et al. Science, 323, 133-138 (2009) with an optical system similar to that described in Lundquist et al., Optics Letters, 33, 1026 (2008) with a numerical aperture of 0.3. FIG. 21 shows a portion of data collected for intensity versus time for a 2-color sequencing reaction on a linear template having blocks of the bases C and G, which are identified by the dye labeled nucleotides 647G and 555C respectively as described in Eid et al. The dark peaks in FIG. 21 correspond with 647G, and the lighter peaks correspond to 555C, demonstrating nucleic acid sequencing using zero-mode waveguides with micromirror arrays. Four-color sequencing can be carried out in a similar manner, as described in Eid, et al.

Although described in some detail for purposes of illustration, it will be readily appreciated that a number of variations known or appreciated by those of skill in the art may be practiced within the scope of present invention. To the extent not already expressly incorporated herein, all published references and patent documents referred to in this disclosure are incorporated herein by reference in their entirety for all purposes.

I claim:

1. A method for producing an array of micromirror structures each having a nanostructure on its top comprising:
   (a) providing a transparent substrate having a cladding layer on top of the substrate and a first hard mask layer on the top of the cladding layer, wherein the cladding layer and first hard mask layers are patterned to have features extending through both layers to the substrate, the pattern having small features and large features, the small features having a lateral dimension that is smaller than the smallest lateral dimension of the large features;
   (b) masking the small features with either a second hard mask layer or a resist;
   (c) etching the substrate to produce depressions in regions of the substrate corresponding to the large features while not etching the regions of the substrate corresponding to the small features;
   (d) undercutting the first hard mask layer;
   (e) depositing a reflective layer such that the deposited reflective layer has discontinuities corresponding to areas wherein the first hard mask layer has been undercut; and
   (f) removing the first hard mask layer and the resist or the second hard mask layer, thereby removing the reflective layer over the regions of the substrate comprising the small features,
   thereby producing micromirror structures, each having a nanostructure on its top.

2. The method of claim 1 wherein the small features have a lateral dimension that is 1.5 times smaller than the smallest lateral dimension of the large features.

3. The method of claim 1 wherein the small features have a lateral dimension that is 10 times smaller than the smallest lateral dimension of the large features.

4. The method of claim 1 comprising the steps of:
   providing a substrate having a cladding layer on top of the substrate and a first hard mask layer on the top of the metal cladding layer, wherein the cladding layer and hard mask layers are patterned to have features extending through both layers to the substrate, the pattern having small features and large features, the small features having a lateral dimension less than or equal to W and the large features having a lateral dimension of greater than W;
   selectively depositing a second hard mask layer onto the first hard mask layer at a vertical thickness of about 0.5 W or greater such that the small features are sealed by the second hard mask layer and the large features are not sealed;
   exposing the substrate to an etchant such that regions of the substrate corresponding to the large features are etched, while the regions of the surface corresponding to the small features are not etched;
   undercutting the first hard mask layer;
   depositing a reflective layer such that the deposited reflective layer has discontinuities corresponding to regions wherein the first hard mask layer has been undercut; and
   removing the first hard mask layer and the second hard mask layer, thereby removing the reflective material over the regions of the substrate comprising the small features,
   thereby producing micromirror structures, each having a nanostructure on its top.

5. The method of claim 1 comprising the steps of:
providing a substrate having a cladding layer on top of the substrate and a first hard mask layer on the top of the metal cladding layer, wherein the cladding layer and first hard mask layers are patterned to have features extending through both layers to the substrate, the pattern having small features and large features, the small features having a lateral dimension that is smaller that the smallest lateral dimension of the large features;
depositing, exposing, and developing a resist in a pattern such that the resist masks the small features;
exposing the substrate to an etchant such that regions of the substrate corresponding to the large features are etched, while the regions of the surface corresponding to the small features are not etched;
undercutting the first hard mask layer;
depositing a reflective layer such that the deposited reflective layer has discontinuities corresponding to regions wherein the hard mask layer has been undercut; and
removing the hard mask layer and the resist, thereby removing the reflective material over the regions of the substrate comprising the small features,
thereby producing micromirror structures, each having a nanostructure on its top.

6. The method of claim 1 wherein the small features have a lateral dimension of less than about 500 nm.

7. The method of claim 1 wherein one or both of the hard mask layers comprise silicon, germanium, silicon germanium, carbon, silicon carbide, chromium, titanium, titanium nitride, tungsten, silver, or gold.

8. The method of claim 4 wherein the step of selectively depositing the second hard mask layer comprises electroplating, chemical vapor deposition, or electroless plating.

9. The method of claim 1 wherein the first hard mask layer and the cladding are etched in the same etch step to produce the small features and large features.

10. A method for selectively etching a substrate comprising;
providing a substrate having a first hard mask on top of the substrate, the first hard mask patterned with small features and large features; the small features having a lateral dimension of W or less and the large features having a lateral dimension of greater than W;
selectively depositing a second hard mask onto the first hard mask at a vertical thickness of about 0.5 W or greater such that the small features are sealed by the second hard mask and the large features are not sealed;
exposing the substrate to an etchant such that regions of the substrate corresponding to the large features are etched, while the regions of the surface corresponding to the small features are not etched; and
removing the second hard mask;
thereby producing a substrate having a patterned hard mask on its surface with etched large features, and un-etched small features.

11. The method of claim 10 wherein between the first hard mask and the substrate is a cladding layer in substantially the same pattern as the first hard mask, further comprising removing the first hard mask, thereby producing a substrate having a patterned cladding on its surface with etched large features, and un-etched small features.

12. A micromirror array comprising:
a transparent substrate having a top surface and a bottom surface, the top surface having an array of protrusions;
a cladding layer on top of each of the protrusions, the cladding layer on each protrusion having at least one nanoscale aperture extending through the cladding layer to the transparent substrate;
a reflective layer disposed on the top surface of the substrate, so as not to cover the nanoscale apertures, whereby when light is directed from below the transparent substrate, the protrusions act as micromirrors, directing light to the nanoscale apertures;
wherein lateral dimensions of both the protrusions and the nanoscale apertures are defined in a single patterning step.

13. A micromirror array comprising:
a transparent substrate having a top surface and a bottom surface, the top surface having an array of protrusions;
a cladding layer on top of each of the protrusions, the cladding layer on each protrusion having at least one nanoscale aperture extending through the cladding layer to the transparent substrate;
a reflective layer disposed on the top surface of the substrate, so as not to cover the nanoscale apertures, whereby when light is directed from below the transparent substrate, the protrusions act as micromirrors, directing light to the nanoscale apertures;
a heat-sink layer disposed on top of the reflective layer.

14. The micromirror array of claim 13 wherein the heat sink layer comprises a metal layer between about 1 micron and about 10 microns in thickness.

15. A method for producing a micromirror array having heat sinks comprising:
providing a transparent substrate having etched regions to form an array of protrusions on the surface of the transparent substrate, the protrusions each having a cladding layer on their tops, and the cladding layer having at least one nanoscale aperture on the top of each protrusion; the nanoscale apertures masked by a first resist which has been patterned to have regions extending over the nanoscale apertures;
depositing a reflective layer onto the substrate such that the reflective layer has gaps at the edges of regions of the first resist extending over the nanoscale apertures;
depositing and patterning a second resist over the regions of first resist, thereby covering the gaps at the edges of regions of the first resist extending over the nanoscale apertures;
plating a heat sink layer onto the reflective layer;
removing the second resist, first resist, and the portions of the reflective coating on top of the first resist;
thereby producing an array of micromirrors, each with a cladding on its top, each with at least one nanoscale aperture on its top, having a heat sink layer extending through the etched regions of the substrate.

* * * * *